US011661118B2

(12) United States Patent
Goodenough

(10) Patent No.: US 11,661,118 B2
(45) Date of Patent: May 30, 2023

(54) TAILGATE FOR VEHICLE

(71) Applicant: Bryce D. Goodenough, Clarkston, WA (US)

(72) Inventor: Bryce D. Goodenough, Clarkston, WA (US)

(*) Notice: Subject to any disclaimer, the term of this patent is extended or adjusted under 35 U.S.C. 154(b) by 239 days.

(21) Appl. No.: 17/211,049

(22) Filed: Mar. 24, 2021

(65) Prior Publication Data

US 2022/0204096 A1 Jun. 30, 2022

Related U.S. Application Data

(60) Provisional application No. 63/132,847, filed on Dec. 31, 2020.

(51) Int. Cl.
*B62D 33/027* (2006.01)
*B62D 33/03* (2006.01)
*B60R 3/02* (2006.01)

(52) U.S. Cl.
CPC ............ *B62D 33/0273* (2013.01); *B60R 3/02* (2013.01); *B62D 33/03* (2013.01)

(58) Field of Classification Search
CPC .. B62D 33/0273; B62D 33/027; B62D 33/03; B60R 3/02
See application file for complete search history.

(56) References Cited

U.S. PATENT DOCUMENTS

| | | | | |
|---|---|---|---|---|
| 1,207,266 A | * | 12/1916 | Bartholomew .... | B62D 33/0273 296/51 |
| 5,312,150 A | * | 5/1994 | Quam ................ | B62D 33/0273 296/57.1 |
| 5,518,287 A | * | 5/1996 | Totani ....................... | B60P 1/26 296/57.1 |
| 6,966,597 B2 | | 11/2005 | Tegtmeier | |
| 7,073,837 B2 | | 7/2006 | Madlinger | |
| 7,735,894 B2 | * | 6/2010 | King .................. | B62D 33/0273 296/62 |
| 9,862,430 B1 | * | 1/2018 | Stojkovic ........... | B62D 33/0273 |
| 10,081,303 B1 | * | 9/2018 | Ngo ........................... | B60R 3/00 |

(Continued)

OTHER PUBLICATIONS

"2019 GMC Sierra MultiPro Tailgate," Video—https://www.youtube.com/watch?v=QIVR6b27dEc, 3 pages.

*Primary Examiner* — Gregory A Blankenship
(74) *Attorney, Agent, or Firm* — Amin, Turocy & Watson, LLP

(57) ABSTRACT

Systems and methods are disclosed for providing a tailgate for a truck that rests at an intermediate level between the ground and the truck bed when the tailgate is disposed in an open/primarily-horizontal position. The inventive tailgate may be hinged below and forward of the rear edge of the bed level such that when opened, it rests at a level below the deck. The tailgate may be hinged with bearings that are constructed to and positioned to reduce the amount of hinge clogging. The inventive tailgate may include a pop-up mini-gate that raises to substantially the same level as the bed for use with transportation of oversized objects. The inventive tailgate may include a foldable or rotatable support structure that may be used to support items that extend beyond the end of the horizontal tailgate. The inventive tailgate may be sealed around three sides of the cargo box to prevent loss of particulate or granular cargo.

20 Claims, 30 Drawing Sheets

(56) References Cited

U.S. PATENT DOCUMENTS

| | | | |
|---|---|---|---|
| 2002/0121794 A1* | 9/2002 | Vejnar | B62D 33/0273 |
| | | | 296/26.11 |
| 2007/0075560 A1 | 4/2007 | Katterloher et al. | |
| 2008/0277958 A1* | 11/2008 | King | B62D 33/0273 |
| | | | 296/50 |
| 2016/0075286 A1* | 3/2016 | Butlin, Jr. | B62D 33/03 |
| | | | 296/50 |
| 2017/0253112 A1* | 9/2017 | Battiato | B60J 10/24 |
| 2017/0282979 A1* | 10/2017 | Singer | B62D 21/14 |
| 2017/0297468 A1* | 10/2017 | Wereski | B62D 33/0273 |
| 2018/0170163 A1* | 6/2018 | Masumoto | B60J 10/86 |
| 2021/0402929 A1* | 12/2021 | Robinson | B62D 33/0273 |
| 2022/0032854 A1* | 2/2022 | Burke | B60R 9/10 |
| 2022/0072939 A1* | 3/2022 | Battiato | B60J 10/84 |
| 2022/0136297 A1* | 5/2022 | Roberson | E05D 15/26 |
| | | | 49/37 |
| 2022/0154514 A1* | 5/2022 | Rosales | E05F 15/614 |
| 2022/0204096 A1* | 6/2022 | Goodenough | B60R 3/02 |
| 2022/0204097 A1* | 6/2022 | Allicock | B62D 33/037 |

* cited by examiner

TAILGATE FOR VEHICLE

CROSS REFERENCE TO RELATED APPLICATION

This application claims priority to U.S. provisional application Ser. No. 63/132,847, filed Dec. 31, 2020, the entirety of which is incorporated herein by reference.

BACKGROUND

Many types of trucks have been built with beds for storage and transportation of materials over the years. Such trucks often have a gate at the rear end of the bed that is commonly referred to as a tailgate. In such trucks, it is common to attach the tailgate using hinges along the bottom edge of the tailgate or at the lower left and right corners of the tailgate. Such hinges permit the tailgate to rotate between a first, vertical position in which the tailgate is substantially perpendicular to the floor of the bed and in which the tailgate may be used to secure items in the bed and a second, horizontal position in which the tailgate is substantially parallel to the floor of the bed and in which items in the bed are more accessible.

The hinges of such tailgates may be inundated with particles when the bed of the truck is used to transport particulate matter such as soil, mulch, fertilizer, sand, grain, or other similar items. In some instances, when a truck travels on a dusty road, the road dust alone may inundate the hinges of the tailgate. When inundated with such particles, the hinges may jam or may become difficult to operate.

Accordingly, it would be desirable to provide a tailgate in which the hinges are constructed and/or positioned in a manner that will reduce the amount of particulate matter that inundates the hinges of the tailgate.

The hinges of common tailgates also restrict the movement of the tailgate such that when the tailgate is in the second, horizontal position, the height of the top side of the tailgate is substantially similar to the height of the truck bed. For many pickup trucks, this height may be between about 26 inches and 36 inches above ground level. Other trucks may have a bed height that is greater than 36 inches. These bed heights are not conducive to climbing into and out of the truck bed to access items stored in the bed. For example, if it is necessary to climb into a truck bed to shovel soil from the bed onto the ground, it will be difficult for most people to step from ground level onto a 36 inch tall bed.

For these reasons, various devices to assist with stepping onto a truck bed have been utilized. In some instances, the corners of the truck bumper are provided with stepping surfaces either on top of the bumper or cut into the bumper. In other instances, fold-down steps are provided from the horizontal tailgate.

In yet other instances, complex hinge mechanisms are provided, such as those illustrated in U.S. Pat. Nos. 6,966,597; 7,073,837; and U.S. Patent Application Publication No. 2007/007,556. However, such devices introduce additional moving parts and complexity that is less desirable for many owners.

For these reasons, it would be desirable to have a tailgate that can be opened to a position suitable for serving as a step between ground level and bed level. It would also be desirable to realize such a tailgate without the need for complex hinges.

For these reasons, it would also be desirable to have a tailgate that allows for transfer of particulate matter out of the bed without undue spillage or jamming of hinges.

For the avoidance of doubt, the above-described contextual background shall not be considered limiting on any of the below-described embodiments, as described in more detail below.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Accordingly, embodiments of the present invention may provide systems, structures, and methods of providing a way to step on a tailgate between ground level and bed level. Such tailgates may be deployed on trucks, trailers, or other suitable vehicles. For purposes of simplicity in discussion, the disclosure herein will reference trucks, but can be applied to trailers and other suitable vehicles.

Embodiments of the invention may provide systems, structures, and methods related to such a tailgate without unduly complex hinge structures.

Embodiments of the invention may provide systems, structures, and methods related to a tailgate that allows for transfer of small and particulate matter from a truck bed without undue spillage.

Embodiments of the invention may provide systems, structures, and methods related to a tailgate that allows for transfer of small and particulate matter from a truck bed without undue jamming of hinges.

Embodiments of the invention may provide systems, structures, and methods related to a tailgate having an embedded support rack that may have guard grooves to align cargos and/or tie-down anchors for securing loads.

Embodiments of the invention may provide systems, structures, and methods related to a tailgate having an embedded mini-gate that is substantially flush with the bed of the truck when deployed, such that oversized loads may be supported by the mini-gate when the tailgate is deployed in a substantially horizontal position and the mini-gate is raised above the tailgate.

One preferred embodiment may provide a tail gate for use with a vehicle having a bed, a front end, and a rear end, comprising an assembly that may be rotated about a substantially horizontal axis from a substantially vertical first position to a substantially horizontal second position, the assembly comprising a gate portion having a surface substantially disposed along a first plane when the assembly is in the first position, wherein the first plane is substantially perpendicular to a first axis, the first axis extending parallel to the bed and from a front center of the vehicle to a rear center of the vehicle; a seal portion attached to the gate portion in proximity to a bottom edge of the gate portion, the seal portion substantially disposed along a second plane parallel to the bed of the vehicle and perpendicular to the first plane when the seal portion is in the first position, the seal portion having a long dimension that is approximately the same as the width of the bed; wherein the seal portion is disposed below a height of the bed and a top edge of the seal portion is arranged in close proximity to the bottom of the bed when the assembly is in the first position; a first pivot structure and a second pivot structure, the first pivot structure located near a first end of the gate portion and mechanically connected to a first end of the gate portion, the second pivot structure located near a second end of the gate portion and mechanically connected to the second end of the gate portion, the first end located opposite the second end; the first pivot structure and the second pivot structure positioned to allow rotation of the assembly about the substantially horizontal axis, the substantially horizontal axis located below the bed and between the first plane and the front end; wherein, when the assembly is in the first position, the gate portion substantially closes the rear end of the bed; and wherein, when the assembly is in the second position, the surface of gate portion is substantially parallel to the bed and below a top level of the bed, and the seal portion is substantially perpendicular to the bed.

This embodiment may further include a support rack embedded within the surface of the gate portion, the support rack pivotally attached to the gate portion, such that when the assembly is in the second position, the support rack may be pivoted from within the surface of the gate portion to an upright position, to provide a support for items laid in the bed and extending beyond the edge of the bed. The embodiment may further include a pop-up mini gate embedded within the surface of the gate portion and extendable in a direction substantially perpendicular to the surface so as to be arranged at a height that is substantially aligned with the top level of the bed when the assembly is in the second position and the mini gate is extended. The embodiment may further include a support rack embedded within the surface of the gate portion, the support rack pivotally attached to the gate portion, such that when the assembly is in the second position, the support rack may be pivoted from within the surface of the gate portion to an upright position; the support rack arranged about the perimeter of the mini gate when both are positioned within the surface of the gate portion.

The embodiment may further be constructed such that the first pivot structure and the second pivot structure are not substantially exposed to solid materials when such materials are in the bed. The embodiment may further include a seal to close gaps between the assembly and the bed to reduce spillage of particulate materials when such materials are in the bed. The embodiment may be included in a vehicle where the vehicle comprises a wheel well for a rear wheel, and a side wall extending upward from the surface of the bed, the side wall arranged substantially perpendicular to the surface of the bed and substantially perpendicular to the first plane, the side wall arranged in proximity to the wheel well; and the first pivot structure is disposed within a compartment between the sidewall and the wheel well; the first pivot structure comprising a thrust bearing. The embodiment may further be constructed so that when the assembly is in the first position, the compartment is substantially closed; and when the assembly is in the second position, the compartment may be accessed for cleaning or lubrication.

The embodiment may further be constructed such that the vehicle has a removable, centered, high ball trailer hitch; and the high ball trailer hitch is positioned to support a bottom surface of the gate portion when the assembly is in the second position. The embodiment may further include a tongue and groove alignment structure disposed at an edge of the gate portion, the alignment structure configured to contact a frame of the vehicle below the bed, the alignment structure for reducing lateral deformation of the gate portion when the assembly is in the second position.

Another preferred embodiment may be described as a pivoting device for use in a vehicle comprising a bed with a top surface arranged substantially perpendicular to a first axis, the first axis extending in the direction of gravity, the bed having a substantially horizontal first bed edge located at the rear of a vehicle, the first bed edge being substantially linear, the pivoting device comprising: a gate having a first substantially rectangular outline and a gate width approximately equal to the length of the first bed edge, the gate having a lower gate edge extending substantially parallel to the first bed edge, the lower gate edge approximately the same length of the first bed edge; a seal portion having a second substantially rectangular outline, the seal portion having a first seal edge, the first seal edge approximately the same length as the lower gate edge, the first seal edge attached along its length to the lower gate edge such that the ends of the first seal edge are in close proximity to the respective ends of the lower gate edge, the second substantially rectangular outline disposed substantially perpendicular to the first substantially rectangular outline; first and second pivoting structures arranged to pivot about a single pivot axis substantially parallel to the first bed edge, the lower gate edge, and the first seal edge, the first and second pivoting structures mechanically attached to the gate; the pivot axis disposed lower than the top surface of the bed and forward of the first bed edge with respect to a primary direction of travel of the vehicle, such that the gate and seal portion may be rotated about the pivot axis between (a) a first position in which the first substantially rectangular outline is substantially perpendicular to the top surface and substantially parallel to the first axis, and (b) a second position in which the first substantially rectangular outline is substantially parallel to the top surface of the bed; and wherein, when disposed in the second position, a top surface of the gate is lower than the top surface of the bed, such that the top surface of the gate may be used as an intermediate step between a surface on which the vehicle is disposed and the top surface of the bed.

The embodiment may be constructed such that when disposed in the second position, the lower gate edge is (a) below the first bed edge and (b) forward or aft of the first bed edge with respect to the primary direction of travel of the vehicle. The embodiment may also include a support rack embedded within the top surface of the gate, the support rack pivotally attached to the gate, such that when the gate is in the second position, the support rack may be pivoted from within the top surface of the gate to an upright position, to provide a support for items laid in the bed and extending beyond the edge of the bed.

The embodiment may include a pop-up mini gate embedded within the top surface of the gate and extendable in a direction substantially perpendicular to the top surface of the gate so as to be arranged at a height that is substantially aligned with the top surface of the bed when the gate is in the second position and the mini gate is extended. The embodiment may also include a support rack embedded within the top surface of the gate, the support rack pivotally attached to the gate, such that when the gate is in the second position, the support rack may be pivoted from within the top surface of the gate to an upright position; the support rack arranged about the perimeter of the mini gate when both are positioned within the surface of the gate position.

The embodiment may be constructed so that the first pivoting structure and the second pivoting structure are not substantially exposed to solid materials when such materials are in the bed. The embodiment may include a seal to close gaps between the gate and the bed to reduce spillage of particulate materials when such materials are in the bed.

The embodiment may be incorporated into a vehicle that comprises a wheel well for a rear wheel, and a side wall extending upward from the top surface of the bed, the side wall arranged substantially perpendicular to the top surface of the bed and substantially perpendicular to the gate, the side wall arranged in proximity to the wheel well; and the first pivoting structure is disposed within a compartment between the sidewall and the wheel well; the first pivoting structure comprises a thrust bearing.

The embodiment may be constructed such that when the gate is in the first position, the compartment is substantially closed; and when the gate is in the second position, the compartment may be accessed for cleaning or lubrication.

The embodiment may be incorporated into a vehicle that has a removable, centered, high ball trailer hitch; and the high ball trailer hitch is positioned to support a bottom surface of the gate when the gate is in the second position.

Various embodiments of the present invention may incorporate one or more of these and the other features described herein. A better understanding of the nature and advantages of the present invention may be gained by reference to the following detailed description and the accompanying drawings.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION OF ILLUSTRATIVE EMBODIMENTS

Figure 1:
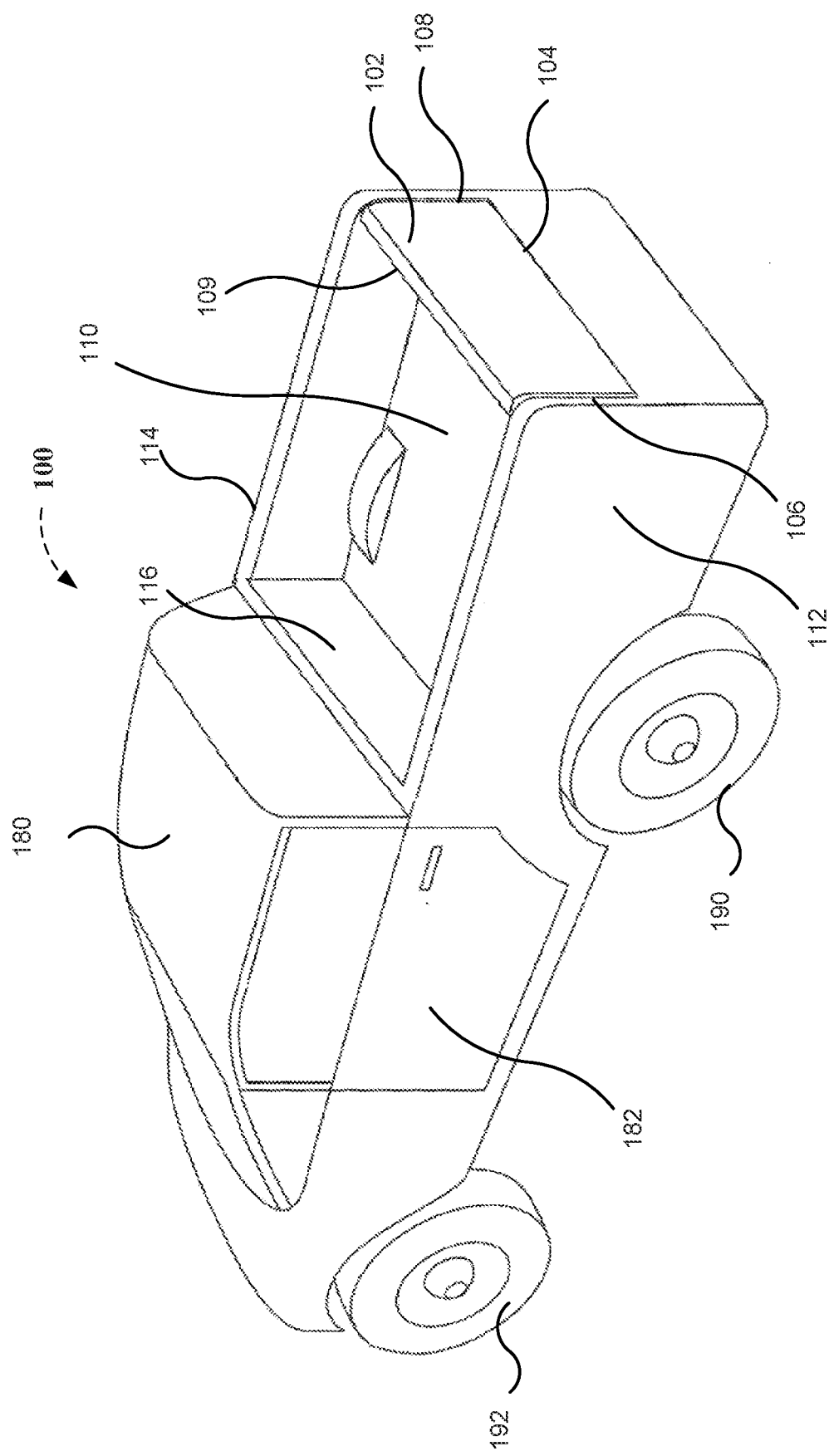
FIG. 1 illustrates a truck employing a prior art tailgate in an upright position.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and devices are shown in block diagram form in order to facilitate describing the various embodiments.

Referring now to FIGS. 1 through 8, an existing version of tailgate is shown in both perspective drawings and block diagrams.

FIG. 1 provides a perspective view of a pickup truck 100 having a tailgate 102 deployed in a closed position (which also may be referred to as an upright or substantially vertical position). Tailgate 102 is typically attached in a rotatable manner at the rear of truck 100 and has an attached edge 104 that is the bottom edge when the tailgate is closed. Edge 104 is in close proximity to the rear end of the truck's bed 110. Edge 104 may be attached to the truck's bed 110 or to sidewalls 112 and 114. Typically, edge 104 will be attached to bed 110 using piano hinges or the like, or edge 104 will be attached to sidewalls 112 and 114 using hinges at the corners that often allow for removal of tailgate 102. Vertical edges 106 and 108 of tailgate 102 are in close proximity to sidewalls 112 and 114, respectively, when the tailgate 102 is in a closed position. However, vertical edges 106 and 108 are not typically sealed to sidewalls 112 and 114 with rubber, gaskets, or the like, but instead are often spaced a small distance from the sidewalls. This arrangement may allow particulate or granular matter to enter or exit the truck bed through the gaps adjacent to any of edges 104, 106, and 108. In a pickup truck, top edge 109 is typically arranged such that it is flush with the tops of sidewalls 112 and 114 when the tailgate is in a closed position.

Figure 2:
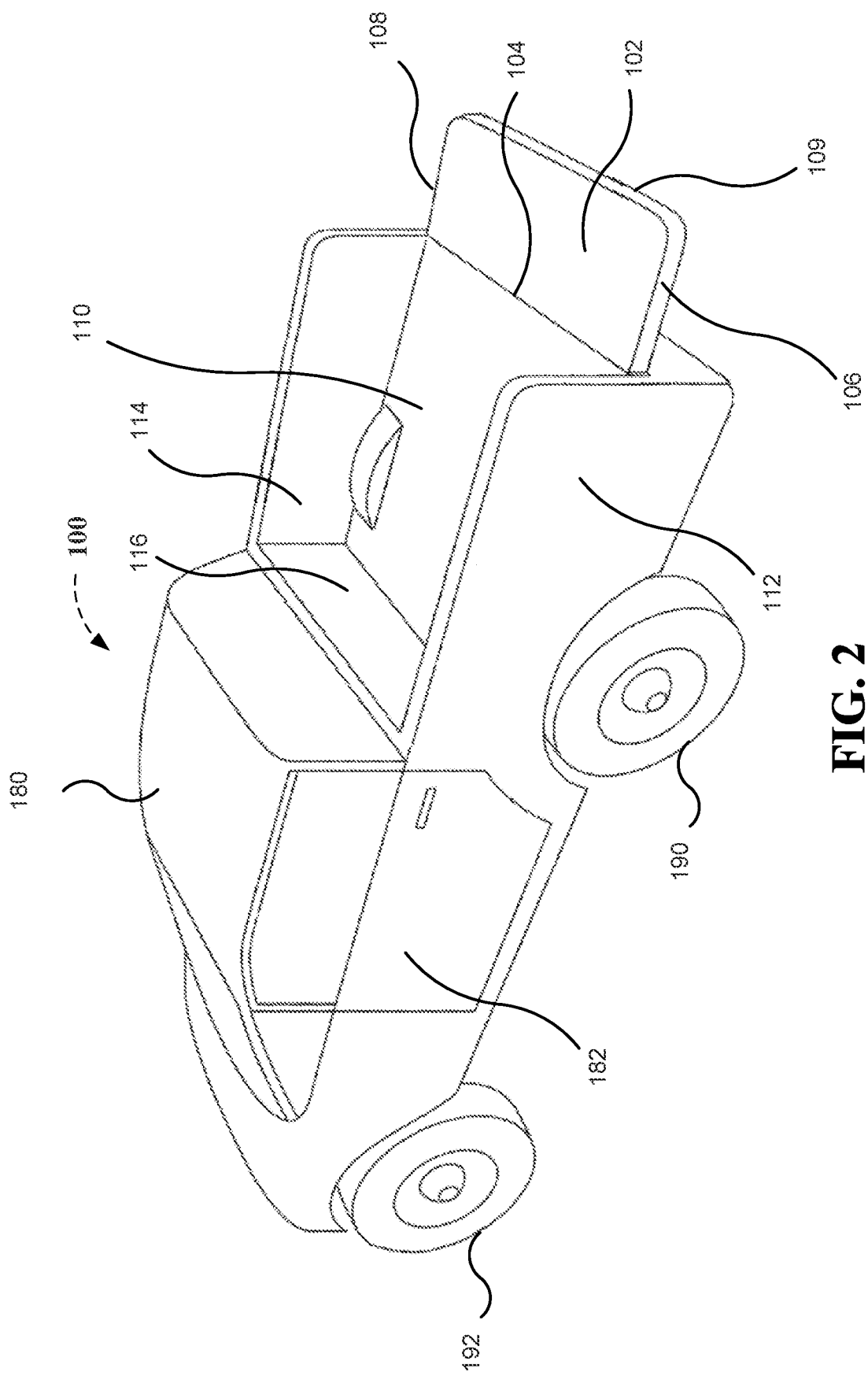
FIG. 2 illustrates a truck employing a prior art tailgate in a horizontal position.

As illustrated in FIGS. 1 and 2, a typical pickup truck has two rear wheels 190 (only one shown) and two front wheels 192 (only one shown). The box of the truck comprises the bed 110, sidewalls 112 and 114, the front wall 116 that is adjacent to a cab 180, and the tailgate 102 opposite wall 116 and at the rear of the truck 100. The cab 180 contains the passenger and driving control areas. Two or more doors 182 (only one shown) allow passenger and driver access to the cab 180.

Referring to FIG. 2, a pickup truck 100 is illustrated with the tailgate 102 in an open position (which also may be referred to as a lowered or substantially horizontal position). The upper side of tailgate 102 is at substantially the same height above the ground as the bed 110, and the upper side of tailgate 102 is substantially parallel to the bed 110. The four edges 104, 106, 108, and 109 are all at substantially the same height above the ground and form a substantially rectangular shape that is substantially parallel to the bed 110. In some versions, restraining devices (not shown) such as chains, cables, or other mechanisms attach the upper portion of sidewalls 112 and 114 to the tailgate 102 at or near the corners. The upper portion of sidewall 112 may be attached to a restraining device that is also attached to the corner of tailgate 102 formed by edges 106 and 109. And the upper portion of sidewall 114 may be attached to a restraining device that is also attached to the corner of tailgate 102 formed by edges 108 and 109. Such restraining devices may be used to provide support to the tailgate to prevent edge 109 from sagging or being otherwise deformed such that it may be closer to the ground than edge 104. While such restraining devices may be used with the inventions described further herein, they may not be necessary due to features of certain embodiments of the invention that prevent sagging without restraints. As illustrated, edge 104 remains closely adjacent to the rear edge of bed 110 when the tailgate 102 is in an open position.

When deployed as shown in FIG. 2 in a typical pickup truck 100, tailgate 102 is likely to be at a height between 26 and 36 inches above ground level. Such a height is above the height that a typical human can step. The inventive tailgate provides for a reduction in the height of an open tailgate such that it more easily permits a human to step or climb on the tailgate.

Figure 3:
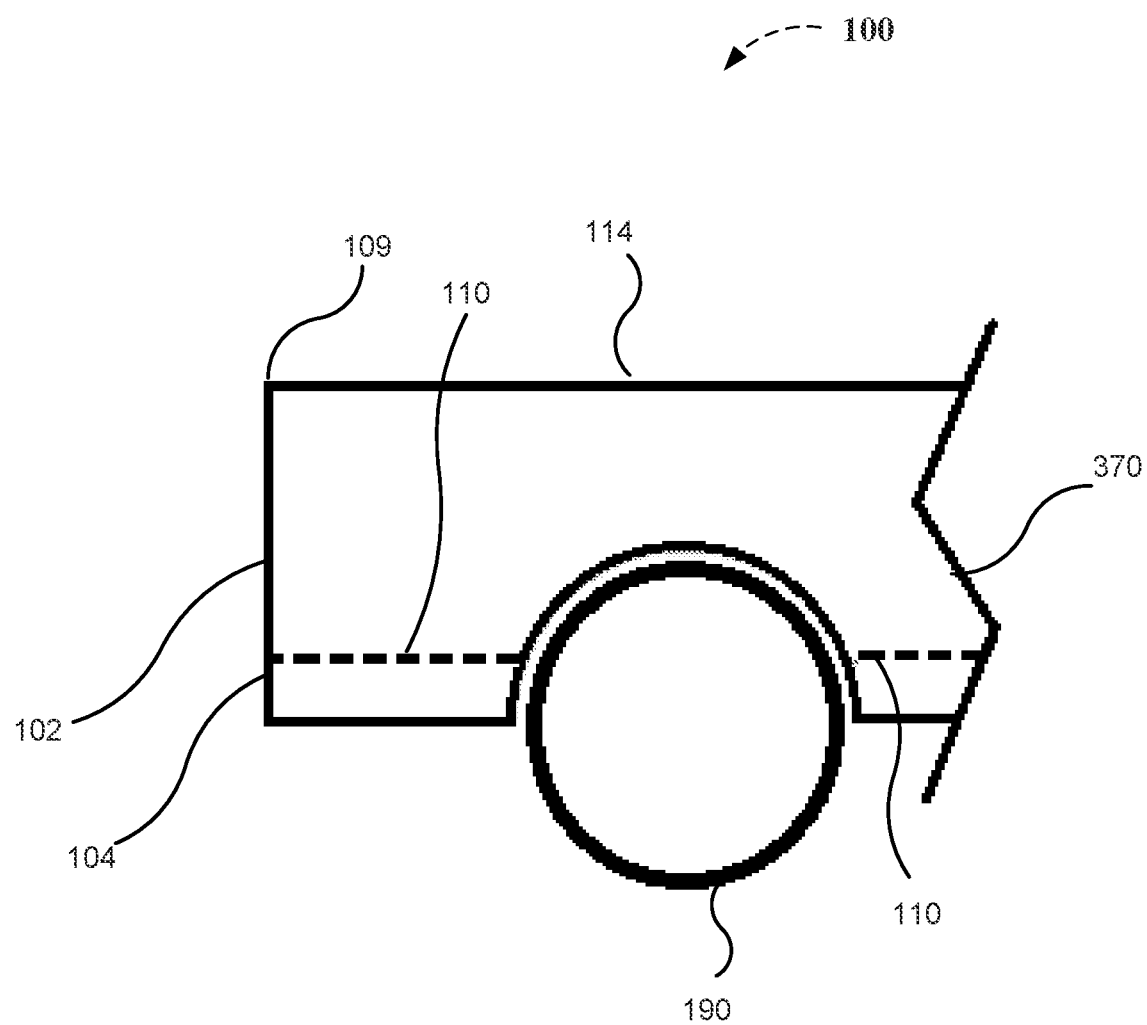
FIG. 3 illustrates a block diagram of a side view of a truck employing a prior art tailgate in an upright position.

FIG. 3 provides a cutaway block diagram of the passenger (right) side of the box of a pickup truck 100 with the tailgate 102 in a closed position. Zig-zag line 370 indicates that the right-most (i.e., forward) portion of the truck has been omitted to simplify the image. The upper surface of the bed 110 is indicated with a dashed line. As shown in FIG. 3, edge 109 is substantially directly above edge 104 when the tailgate 102 is closed. The block diagram of FIG. 3 corresponds closely to the perspective image of FIG. 1.

Figure 4:
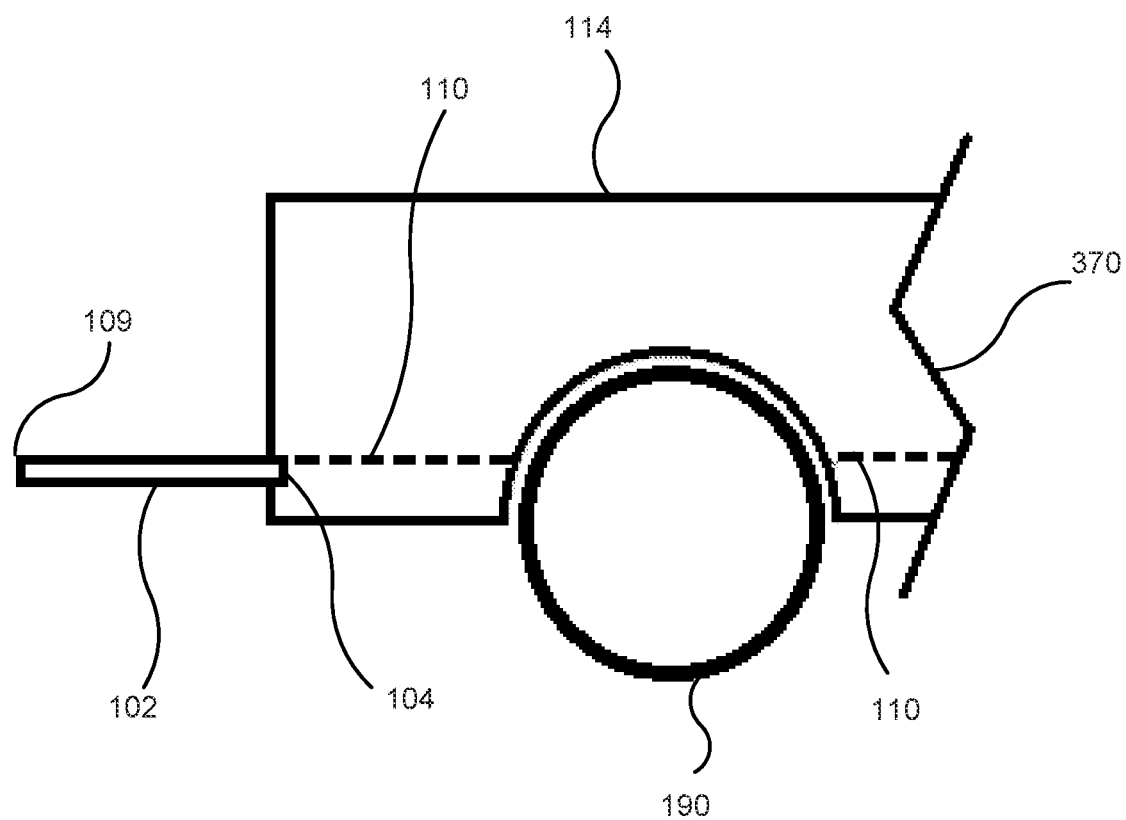
FIG. 4 illustrates a block diagram of a side view of a truck employing a prior art tailgate in an horizontal position.

Referring to FIG. 4, the block diagram shows tailgate 102 pivoted to an open/horizontal position. In this position, edge 104 remains closely adjacent to the rear edge of bed 110. Edge 109 has pivoted away from the truck 100 such that edge 109 is at substantially the same height above the ground as is edge 104. The block diagram of FIG. 4 corresponds closely to the perspective image of FIG. 2.

Figure 5:
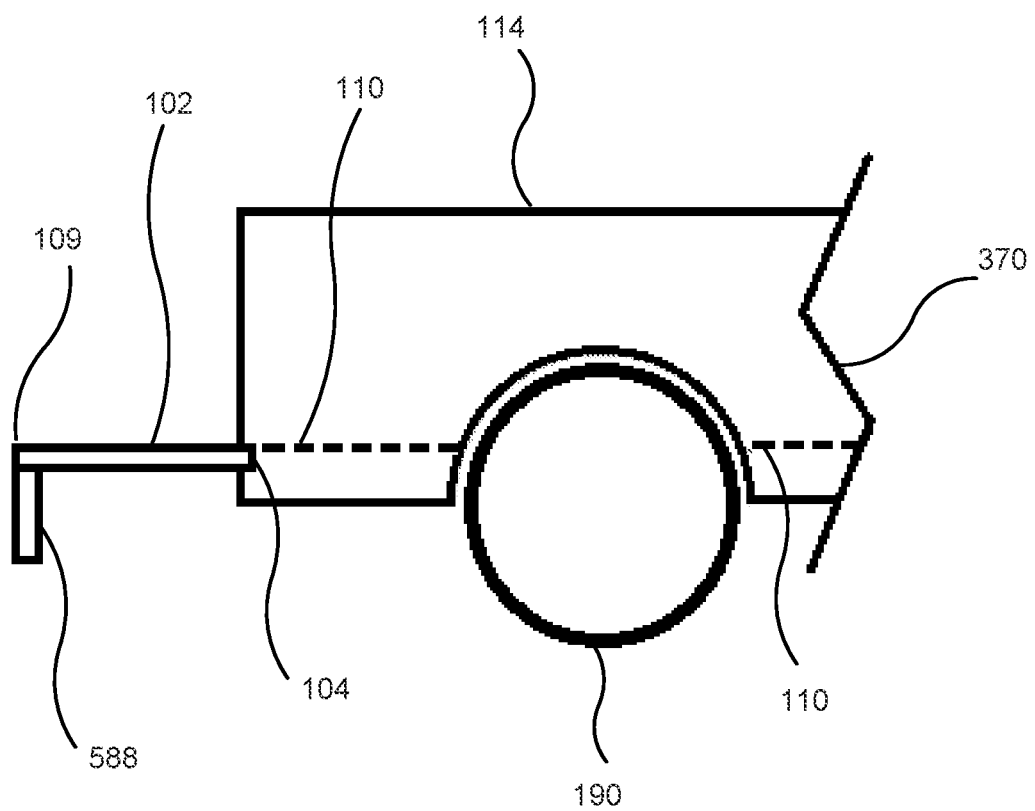
FIG. 5 illustrates a block diagram of a side view of a truck employing a prior art tailgate in a horizontal position.
Figure 6:
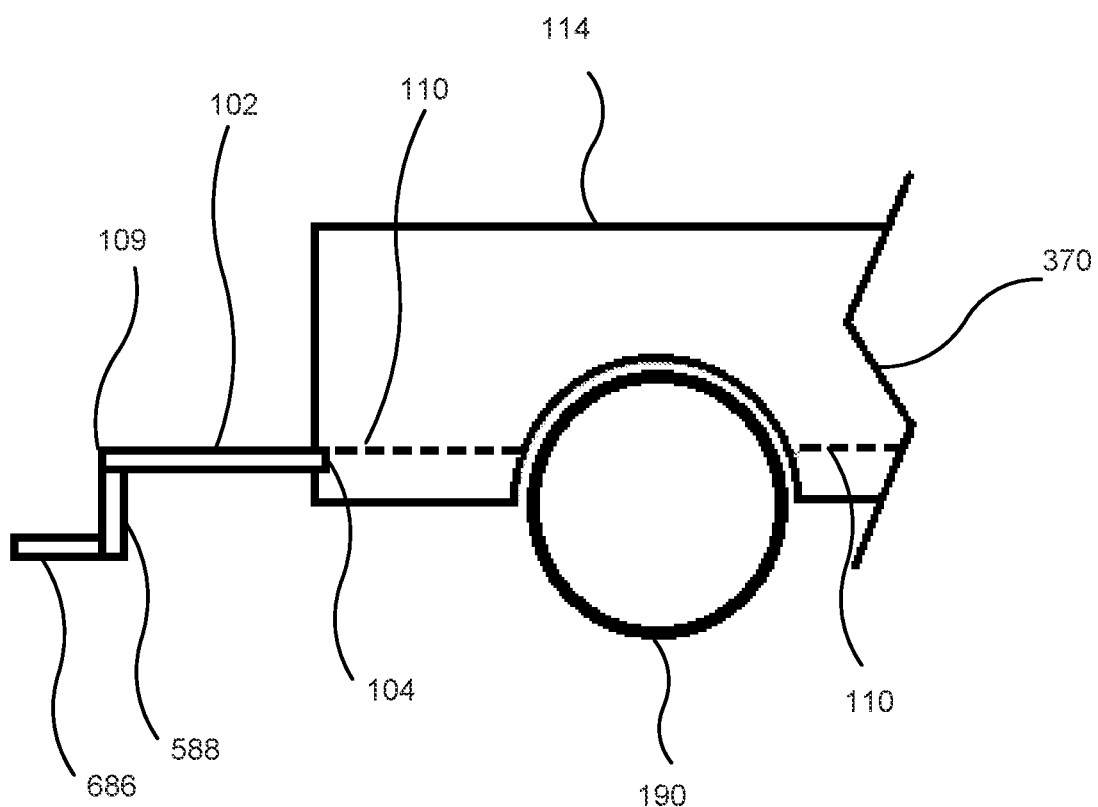
FIG. 6 illustrates a block diagram of a side view of a truck employing a prior art tailgate in a horizontal position.

FIGS. 5 and 6 provide block diagrams of a device that some have used to attempt to overcome the problems posed in climbing onto the tailgate 102 or bed 110. Such devices include structures that may be unfolded from or attached to tailgate 102. Support structure 588 is a substantially vertical structure attached to and extending below tailgate 102. Step 686 is a substantially horizontal structure that may serve as a step between the ground level and the height of tailgate 102. As shown, step 686 may be folded into structure 585, and the structure 585 may be folded or inserted into a depression or cavity in tailgate 102. Alternatively, structure 585 and step 686 may be detached from tailgate 102 when not in use. Such steps 686 are intended to solve the problem of stepping onto tailgate 102 but are themselves problematic due to the additional complexity of the structure and the inherently less-stable nature of a step that is smaller than the entirety of the tailgate 102. Such steps 686 may also prove problematic if inundated with particulate or granular matter and prevented from fully opening, closing, or attaching based on such matter.

Figure 7:
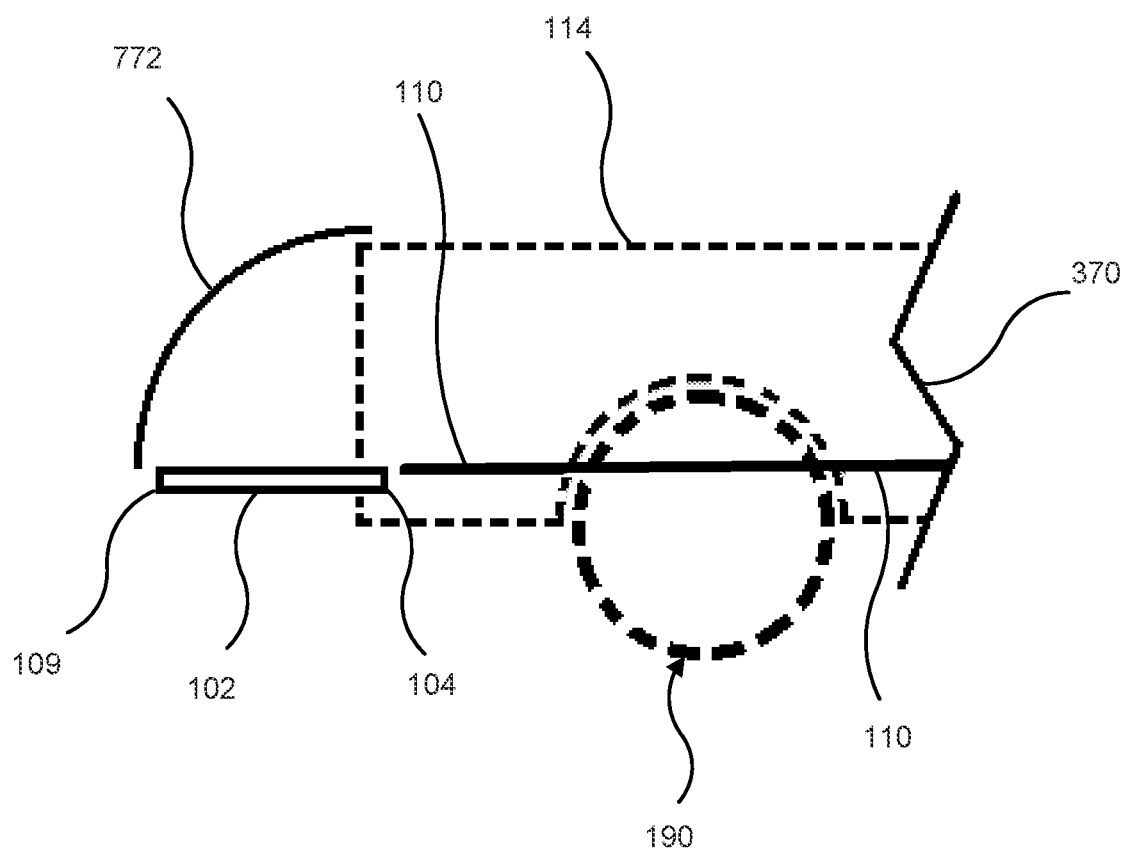
FIG. 7 illustrates a block diagram of a cutaway side view of a truck along the centerline of the truck employing a prior art tailgate in a horizontal position.
Figure 8:
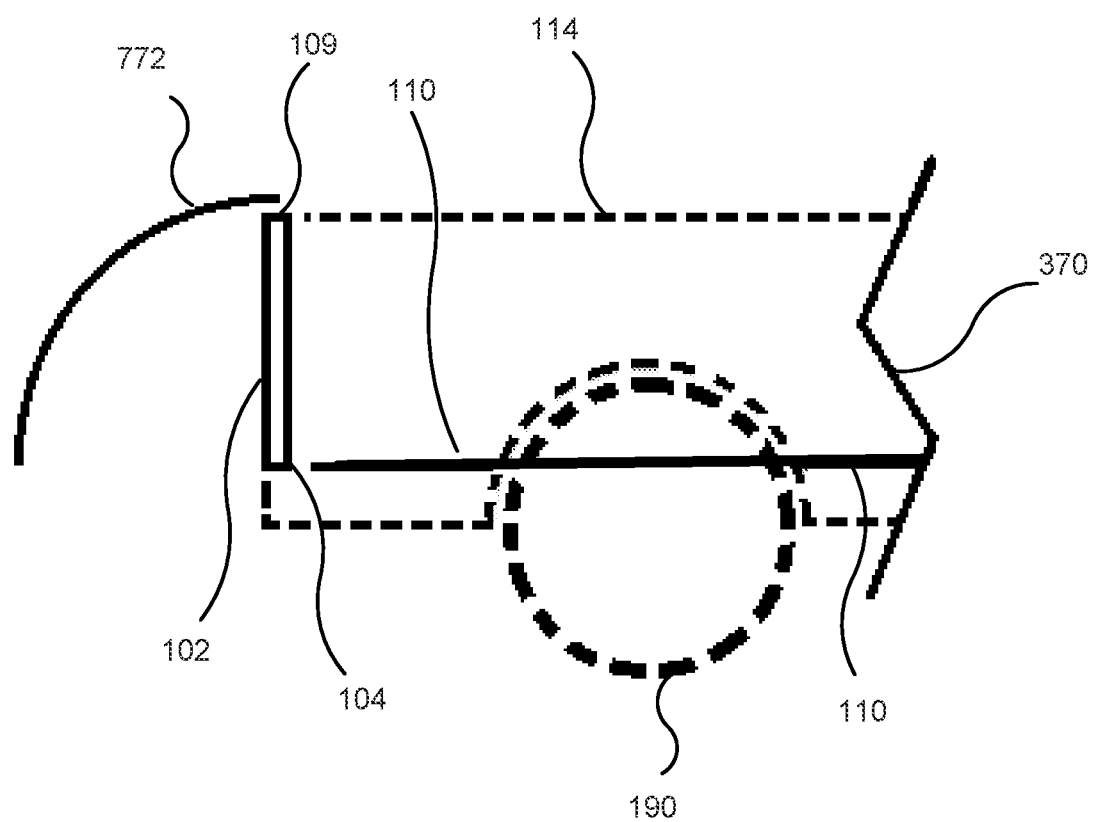
FIG. 8 illustrates a block diagram of a cutaway side view of a truck along the centerline of the truck employing a prior art tailgate in an upright position.

FIGS. 7 and 8 show cutaway block diagrams of a cross section of the box of a pickup truck taken at or near the midpoint of the bed along a vertical plane that is parallel to the primary direction of travel of the truck 100. Because the diagrams are at the midpoint, sidewall 114 and wheel 190 are indicated with dashed lines while bed 110 and gate 102 are indicated with solid lines. As indicated, edge 104 is substantially adjacent to the rear edge of bed 110 when tailgate 102 is in an open position. And edge 109 arcs between a closed position in which edge 109 is substantially vertically above edge 104 and an open position in which edge 109 is disposed substantially horizontal to and rearward (with respect to the primary direction of travel of truck 100) to edge 104. Arc 772 illustrates the path taken by edge 109 when the tailgate 102 is rotated about a hinge at edge 104 between open/horizontal and closed/vertical positions.

Figure 9:
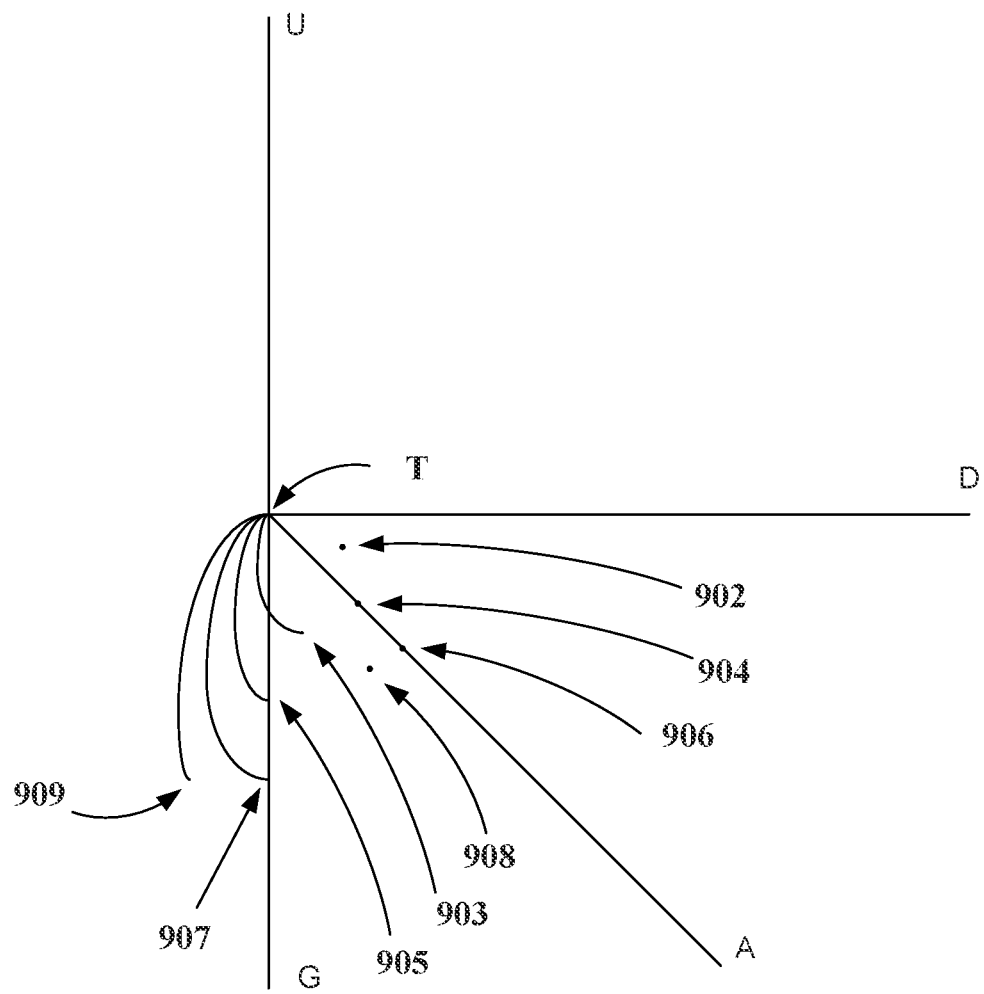
FIG. 9 illustrates a line diagram of rotation points and paths according to an embodiment of the present invention.
Figure 10:
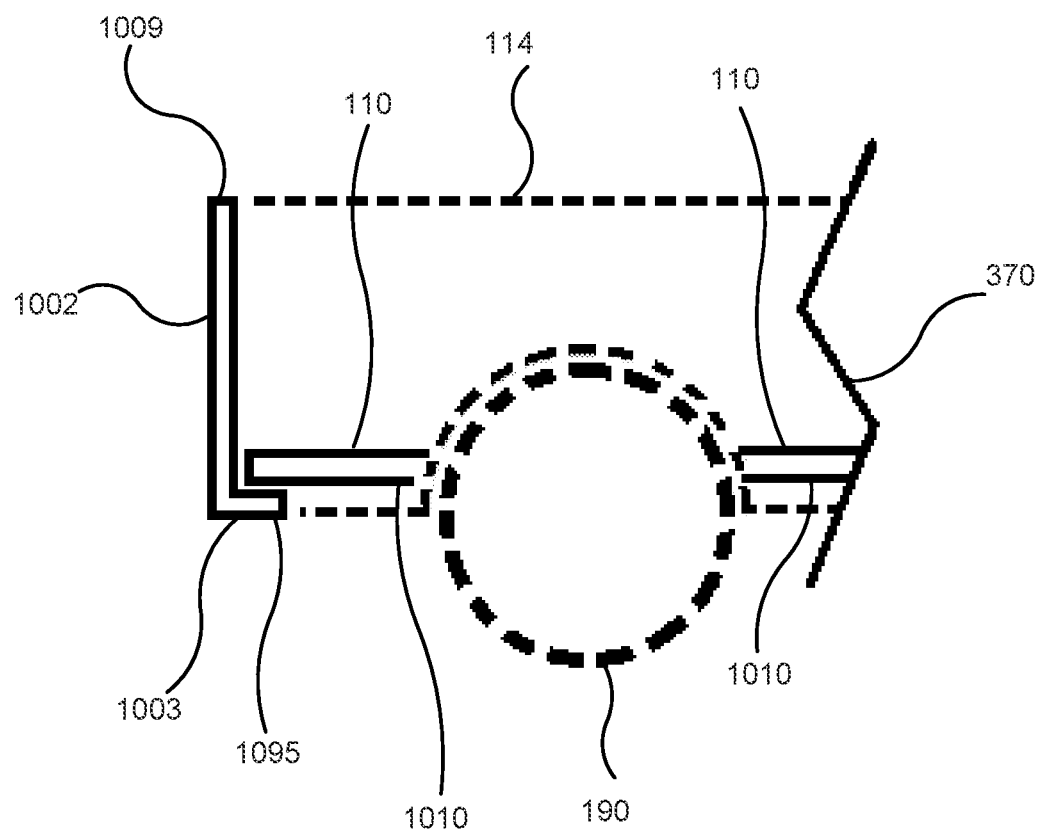
FIG. 10 illustrates a block diagram of a cutaway side view of a truck along the centerline of the truck employing an embodiment of the inventive tailgate in an upright position.
Figure 11:
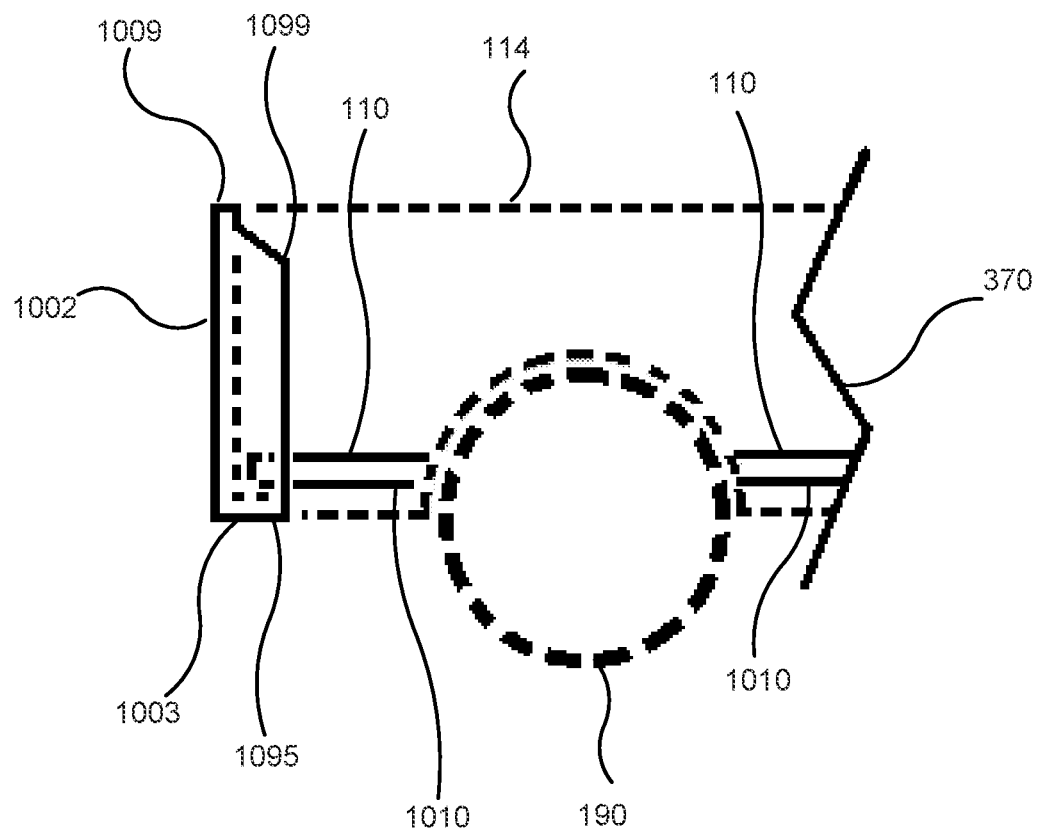
FIG. 11 illustrates a block diagram of a cutaway side view of a truck employing an embodiment of the inventive tailgate in an upright position.

FIG. 9 represents a cartesian graph having the same orientation as the block diagram of FIGS. 10 and 11. The notation U represents the top of a tailgate. The notation G represents the ground below a truck. The notation T represents that point at which the bottom edge of a closed gate (such as tailgate 102) touches the rear edge of the bed (such as bed 110) of the truck 100. The line segment TD represents the upper surface of the bed 110. The line segment TA is disposed at a 45-degree angle from TD and a 45 degree angle from line segment TG.

Points 902, 904, 906, 908 represent approximations of potential pivot points for an inventive tailgate. Arcs 903, 905, 907, 909 represent arcs of circles corresponding to points 902, 904, 906, 908. Notably, for purposes of clarity in FIG. 9 and to reduce overlapping portions, arcs 903, 905, 907, 909 are not drawn as perfect arcs, but instead are intended to represent arcs. Rotation of the portion of a tailgate that contacts the edge of the bed by ninety degrees from closed/vertical position to open/horizontal position may be represented by these points and arcs.

Point 906 falls on line segment TA. Assume a rotation of ninety degrees from vertical to horizontal. A ninety-degree arc drawn around rotation point 906 with a radius equal in length to the distance between T and point 906 is represented by arc 907. One end of arc 907 is at point T and the opposite end falls on the line segment TG based on the position of rotation point 906, indicating that the lower portion of the tailgate will end directly beneath the edge of the bed.

Point 904 also falls on line segment TA, between point 906 and T. A ninety-degree arc drawn around rotation point 904 with a radius equal in length to the distance between T and point 904 is represented by arc 905. The end points of this arc are similar to those of the arc drawn around point 906. The upper endpoint is point T. The lower endpoint is on the line segment TA.

A point 902 is placed in the area bounded by line segments TD, TA, and AD (not shown). A ninety-degree arc 903 drawn about point 902 with radius equal to the distance between T and 902 will have a starting point at T and an endpoint in the area bounded by TG, TA, and AG (not shown). With this endpoint, it is apparent that the lower portion of the tailgate will be between the ground G and the bed (labeled TD) and will be forward of point T with respect to the ordinary direction of travel of truck 100.

Point 908 is placed in the area bounded by line segments TG, TA, and AG (not shown). A ninety-degree arc 909 drawn about point 908 with radius equal to the distance between T and 908 will have a starting point at T and an endpoint to the left of line segment UG, or aft of the edge of the bed with respect to the primary direction of travel of the truck 100.

These rotation points and the corresponding arcs inform the placement of the bearings or hinges on which the inventive tailgate rotates. With respect to point 903, while it may be desirable for the edge of the opened tailgate to be slightly under the edge of the truck bed TD, if point 903 is moved to far (for example to the right), then the rotating tailgate may interfere with or be interfered with by other parts of the truck 100. Similarly, while rotation about point 908 moves the tailgate into a position that would be more likely to avoid interference or problems, if the position is moved too far, such move might negate the usefulness of certain features of the inventive tailgate, depending on the embodiment to be used. In the preferred embodiments of the invention as used in a pickup truck, it is preferable to place the rotation point approximately six inches forward of the rear edge (line segment UG) of the bed and approximately six inches below the top of the bed (line segment TD), by using lever arms outside of the bed and preferably isolated from the wheel wells. This rotation point would be along line segment TA, and would result in the top of the tailgate being approximately one foot lower than the top of the bed when the tailgate is in the open/horizontal position.

FIGS. 10-15 are a series of block diagrams of preferred embodiments of the inventive tailgate, all from same viewing perspective as FIGS. 3-8.

FIG. 10 corresponds closely with FIG. 8 and shows a cutaway block diagram of a cross section of the box of a pickup truck taken at or near the midpoint of the bed along a vertical plane that is parallel to the primary direction of travel of the truck 100. Tailgate 1002 has a top edge 1009 and a lever arm 1003 that may also serve as an additional seal or may be fitted with a seal beneath the truck bed if the lever arm 1003 is extended across the width of the bed such that it is in proximity to the lower side of the bed 1010 when the tailgate 1002 is in the closed/vertical position as in this FIG. Such a feature may be used to reduce the loss of particulate or granular matter being transported in the truck and may also serve to reduce the loss of granular matter under the truck when opened and the truck is being loaded or unloaded over the tailgate. When the tailgate 1002 is open/horizontal, the portion of lever arm 1003 that extends across the bed can serve similar to a stair riser insofar as it may help to prevent a human foot from slipping into the gap between the bottom of the bed 1010 and the tailgate 1002, and may also serve to reduce the loss of granular or particulate matter that may otherwise spill into the gap between the bottom of the bed 1010 and the tailgate 1002 and drop beneath the truck. Point 1095 represents the foremost portion of the lever arm and the approximate location of the axis of rotation of tailgate 1002, although it will be recognized by those of skill in the art that the axis of rotation preferably not on the edge of the lever arm.

FIG. 11 corresponds closely with FIG. 3 and shows a portion of the truck 100 that is closer to the viewer to illustrate the preferred lever arm more fully. This view may correspond to FIG. 21 wherein lever arm 1003 is visible from outside the truck while the gate 1002 is closed or FIG. 29 wherein lever arm 1003 is largely blocked from view from outside the truck while the gate 1002 is closed. As shown in FIG. 11, lever arm 1003, which is preferably a metal similar to the metal used for formation of the tailgate 1002, has a trapezoidal shape that extends roughly from point 1095 to point 1099, and from each of those points to tailgate 1002. Lever arm 1003 and tailgate 1002 may be rotated about a point at or near point 1095. Lever arm 1003 is arranged substantially perpendicularly to tailgate 1002 and attached together so as to provide additional resistances to stress, deformation, and the forces that may otherwise tend to distort the shape of tailgate 1002. For this reason, it preferable to deploy tailgate 1002 and lever arm 1003 without the use of the restraining devices used in the prior art tailgates to prevent sagging or deformation. Use of tailgate 1002 without such restraining devices can decrease mechanical complexity and potential failure points while also increasing the ability to work in and around tailgate 1002 without interference by such restraining devices.

Figure 12:
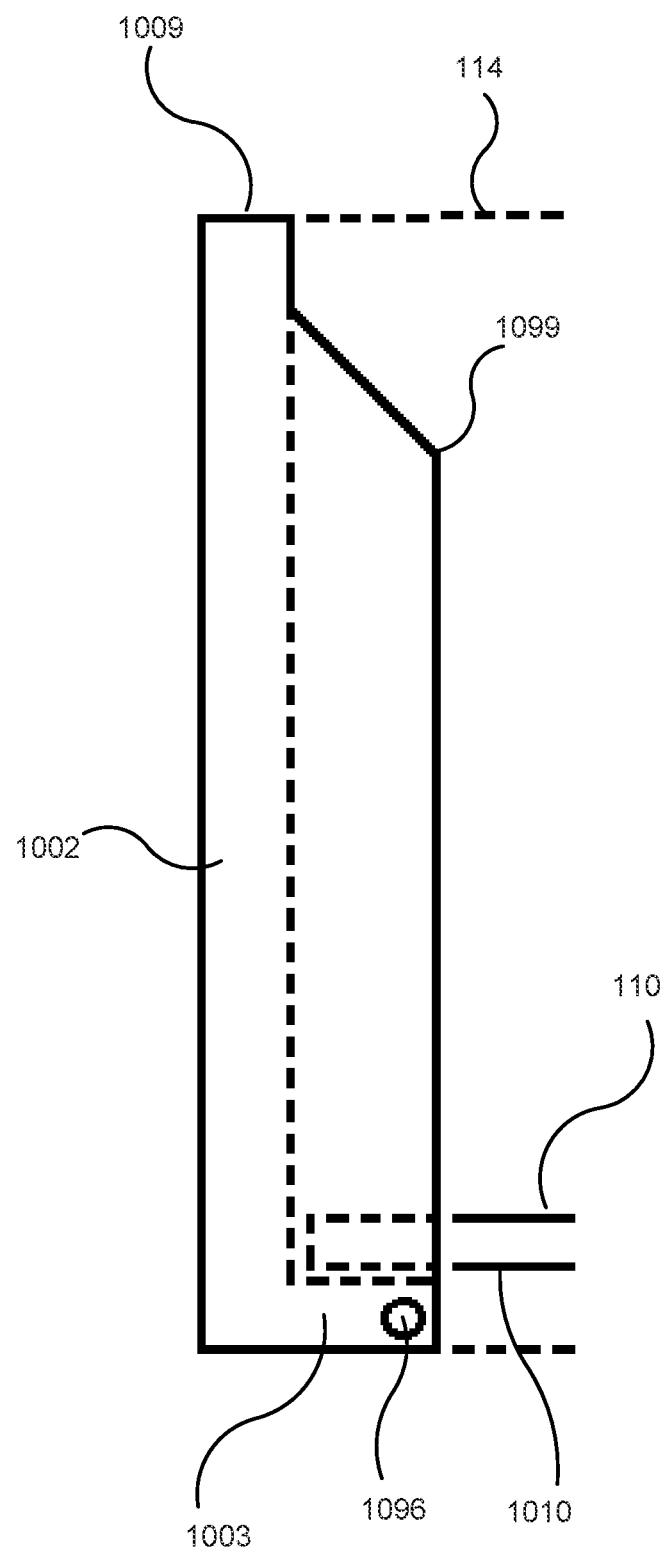
FIG. 12 illustrates a block diagram of a side view of an embodiment of the inventive tailgate in an upright position.
Figure 13:
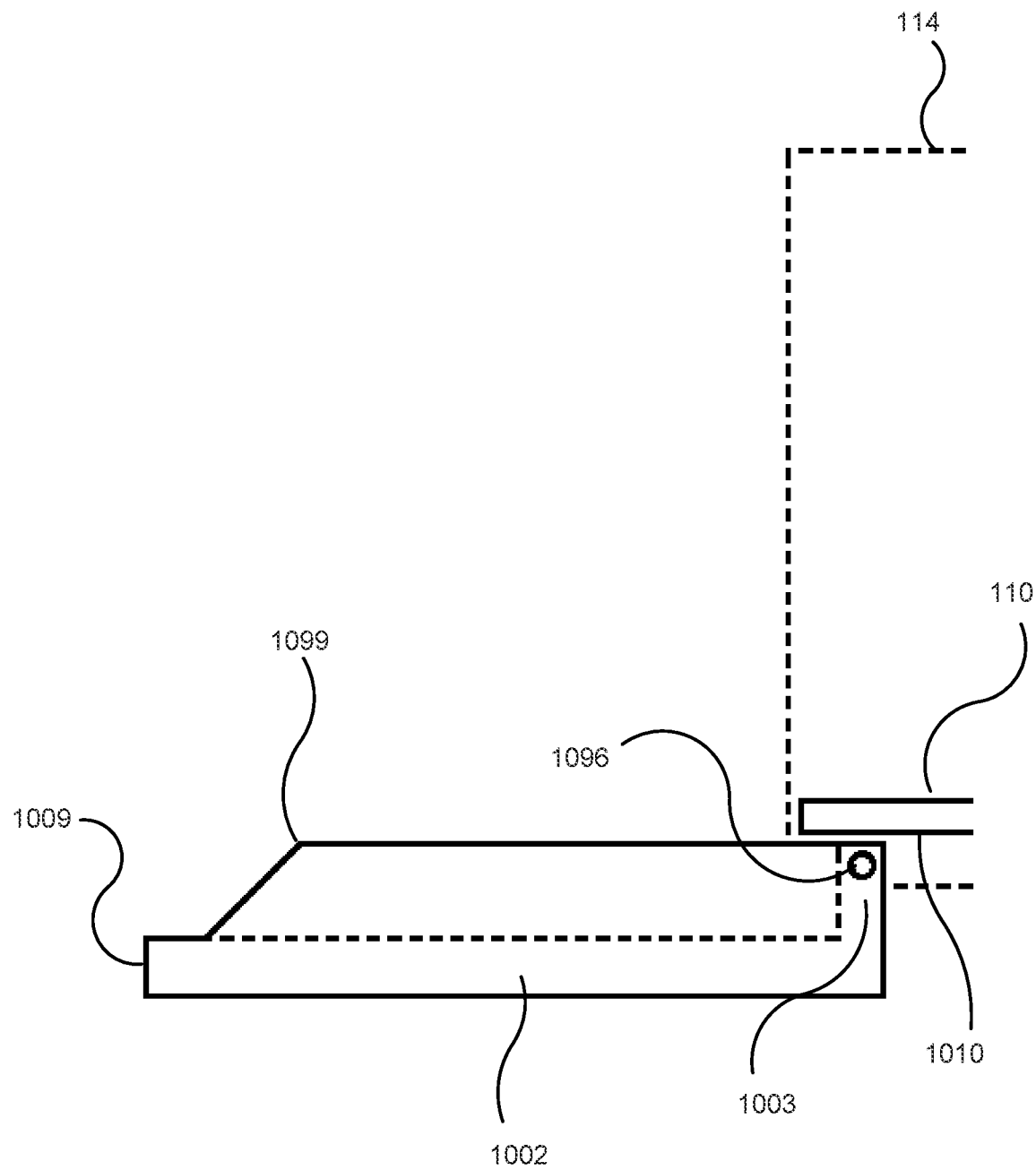
FIG. 13 illustrates a block diagram of a side view of an embodiment of the inventive tailgate in a horizontal position.

FIGS. 12 and 13 are block diagrams that focus more fully upon a preferred embodiment of the inventive tailgate 1002, wherein the cargo box of the truck including sidewall 114 is partially shown using dashed lines. As illustrated, tailgate 1002 may be configured to rotate about thrust bearings 1096 that are attached to lever arm 1003 in a position that is below the lower side 1010 of the truck bed. Such attachment position will permit rotation of the tailgate 1002 in the manner described with respect to FIG. 9. In FIG. 12, tailgate 1002 is depicted in a closed/vertical position. In FIG. 13, the same tailgate 1002 is depicted in an open/horizontal position, and dashed lines on tailgate 1002 and lever arm 1003 show the difference in profile of the mid-section of the tailgate 1002 as opposed to the ends of the tailgate where the lever arm 1003 is more substantial.

Figure 14:
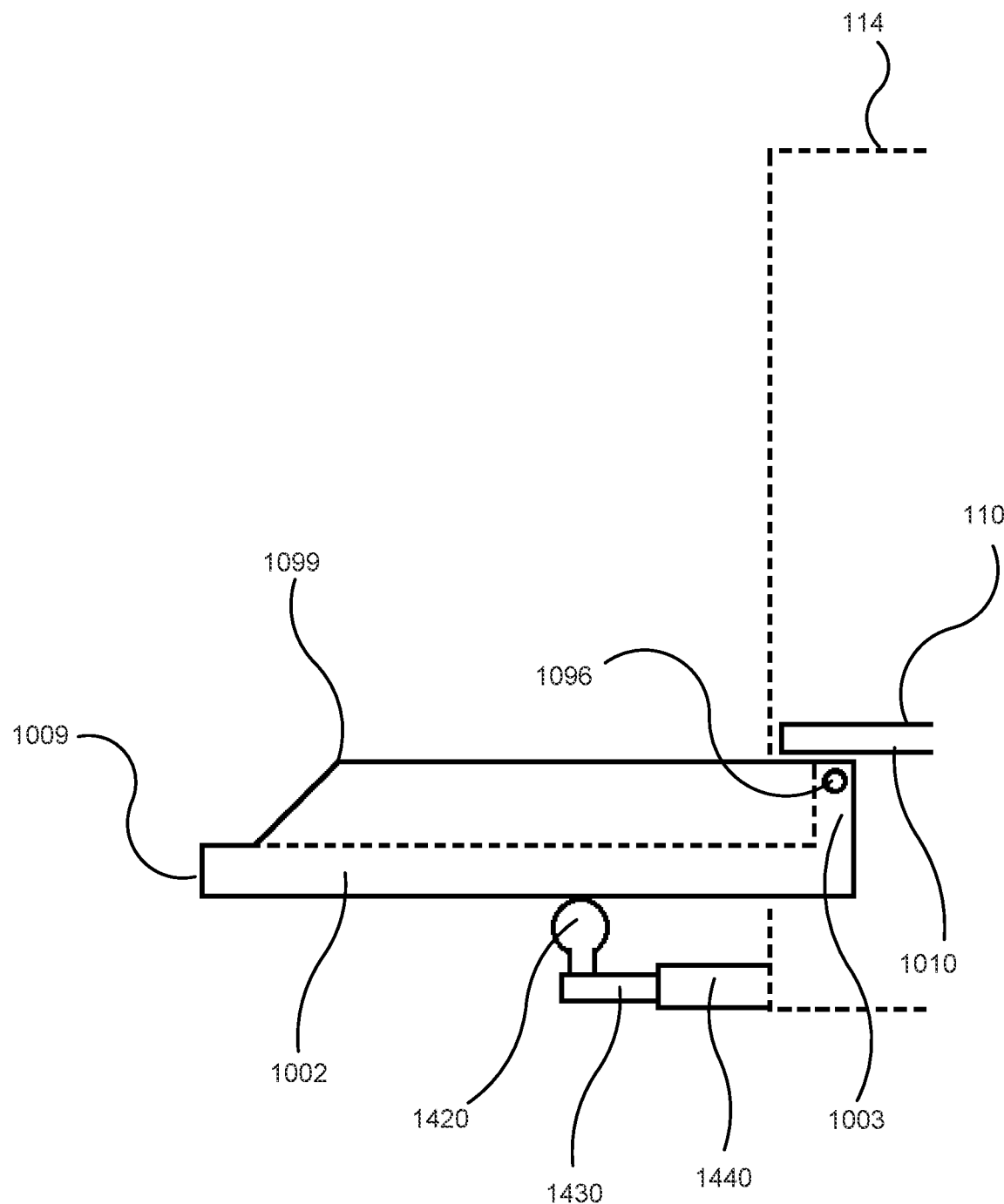
FIG. 14 illustrates a block diagram of a side view of an embodiment of the inventive tailgate in a horizontal position.

FIG. 14 depicts a preferred embodiment of the invention that is very similar to that shown in FIG. 13, but with the addition of a trailer hitch. The trailer hitch is depicted as ball 1420, ball mount 1430, and receiver 1440. These parts are arranged in such a manner that when the tailgate 1002 is in the open/horizontal position, the top of ball 1420 is in contact with tailgate 1002 so as to provide additional support to tailgate 1002 against sagging or deformation. It is recognized that such metal to metal contact may result in damage to the paint of tailgate 1002. Thus, it may be desirable to provide a bumper or other protective device on tailgate 1002 so that damage from contacting ball 1420 may be minimized, while still gaining the advantage of the extra support provided by ball 1420.

Figure 15:
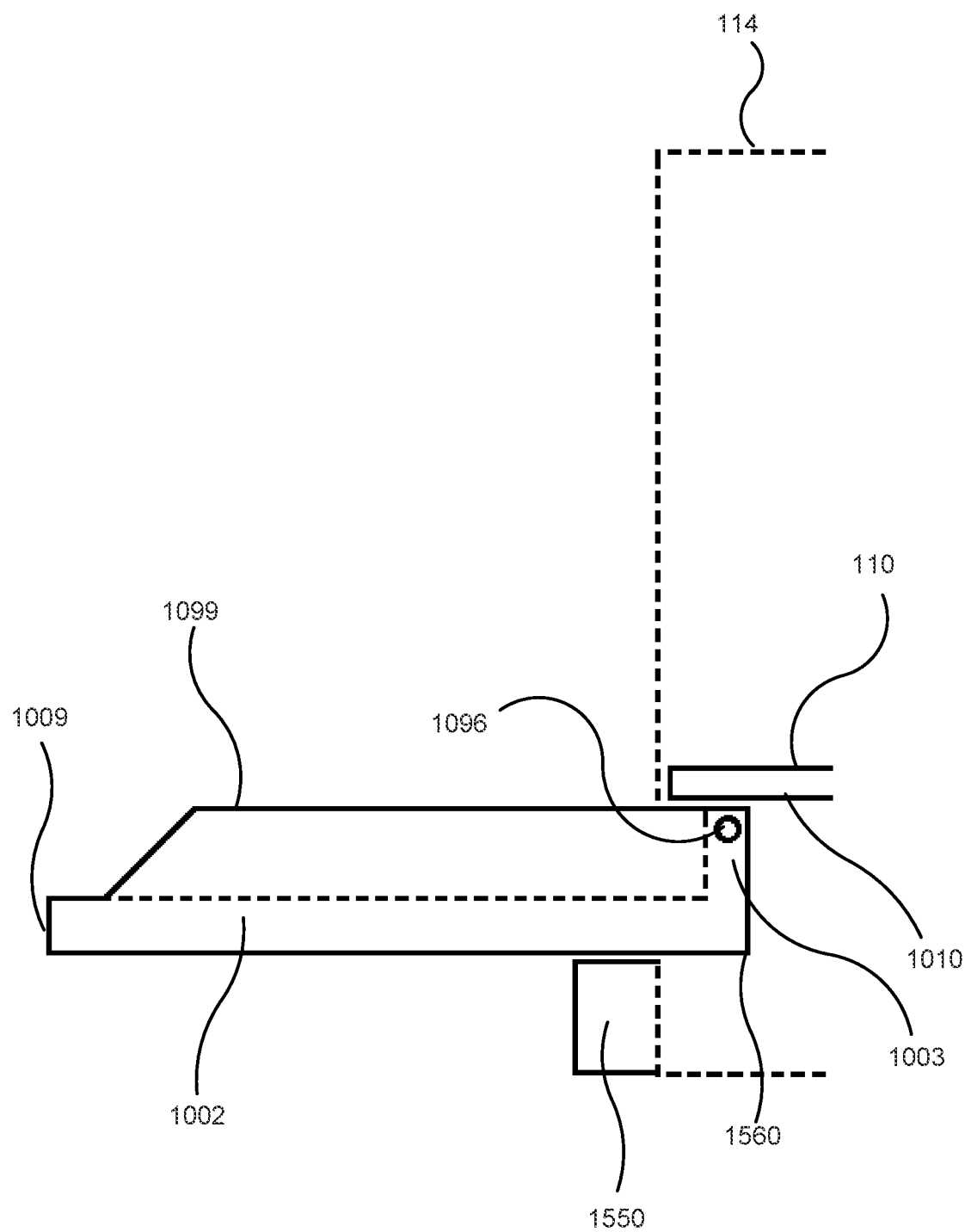
FIG. 15 illustrates a block diagram of a side view of an embodiment of the inventive tailgate in a horizontal position.

FIG. 15 depicts yet another preferred embodiment of the invention that is very similar to that shown in FIG. 13, but with the addition of a rudimentary bumper. The bumper 1550 is arranged so as to be in contact with the lower side of tailgate 1002 when tailgate 1002 is deployed in an open/horizontal position. As with the embodiment described with respect to FIG. 14, it is expected that contact between bumper 1550 and tailgate 1002 may cause damage if a protective device is not present. Thus it may be desirable to provide a protective device between bumper 1550 and tailgate 1002. One of ordinary skill will recognize that the configuration of the tailgate 1002 may result in blockage or scraping against bumper 1550 at the point marked 1560. Thus, if the embodiment depicted in FIG. 15 is deployed, it may be desirable or necessary to provide a beveled, radiused, or similarly modified tailgate that will eliminate contact that would otherwise occur at point 1560 during rotation of tailgate 1002.

Figure 16:
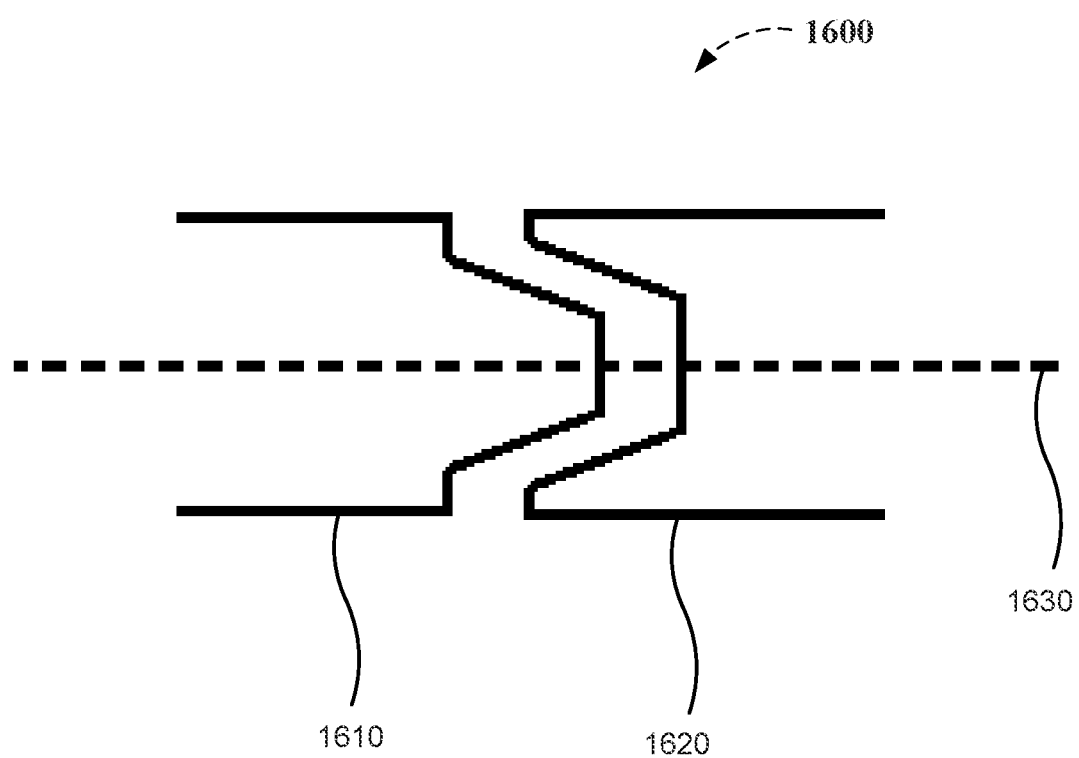
FIG. 16 illustrates a block diagram of a thrust bearing according to an embodiment of the invention.

FIG. 16 is a block diagram of a thrust bearing 1600 suitable for use as thrust bearing 1096 in the inventive tailgate 1002. Substantially conical portion 1610 may be attached to the tailgate 1002. Substantially conical receiver 1620 may be attached to the truck frame, body, or other suitable mounting point. Rotation axis 1630 is represented by a dashed line. Axis 1630 is substantially perpendicular to the primary direction of travel of the truck and substantially parallel to the rear edge of the truck bed and flat ground. Axis 1630 is also substantially perpendicular to a vertical axis when in use. Thrust bearing 1600 may include balls or rollers between portion 1610 and receiver 1620. A thrust bearing is desirable for the inventive tailgate 1002 because it will allow particulate and/or granular debris to fall out rather than becoming trapped within the bearing. It is preferable that the thrust bearing have an approximately fifteen degree horizontal taper.

Figure 17:
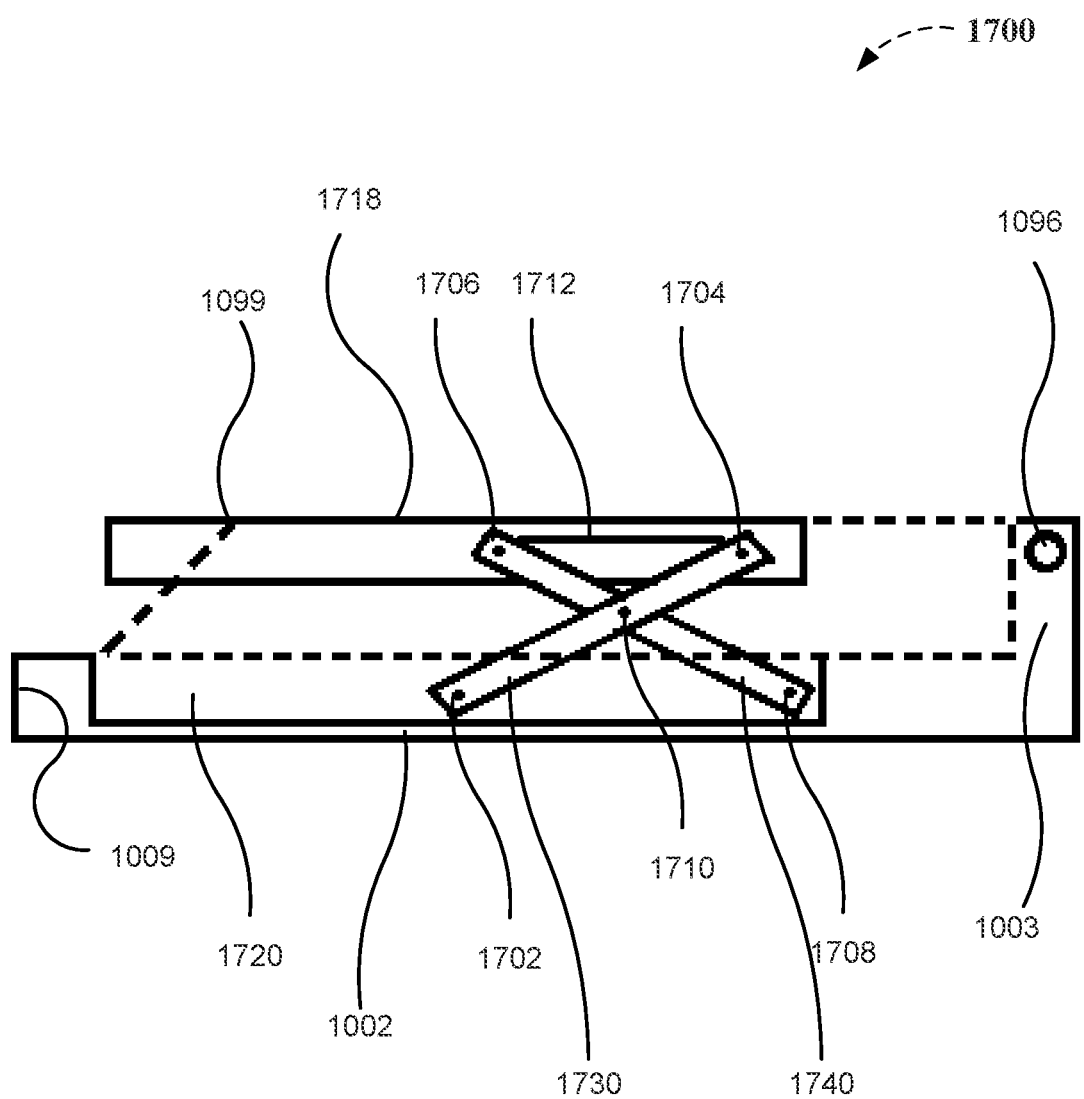
FIG. 17 illustrates a block diagram of a side view of an embodiment of the inventive tailgate in a horizontal position.

FIG. 17 depicts a block diagram of an alternative embodiment of the inventive tailgate 1002 in which a pop-up mini-deck 1718 is housed within a recessed portion 1720 of tailgate 1002. Mini-deck 1718 may be optionally raised to approximate the height of the truck bed 110 so that when the tailgate 1002 is in the open/horizontal position, the mini-deck 1718 functionally serves as an extension of the truck bed 110 for purposes of supporting cargo that is longer than the bed 110 of the truck 100, for example, pipes, lumber, or other lengthy cargo. Mini-deck 1718 may be optionally configured so that it can be deployed when the tailgate 1002 is in the closed/vertical position, so that mini-deck 1718 may serve to reduce the length of the bed 110 to put pressure on cargo when a small amount of such pressure may help to secure the cargo.

Mini-deck 1718 may be sealed at its edges with a gasket or other appropriate seal to prevent excess debris or particulate matter from entering recess 1720 when the mini-deck is not raised. Mini-deck 1718 may be raised and supported by a dual scissor support 1730, 1740. The beams 1730 and 1740 of the scissor support may be attached to the tailgate 1002 at points 1702 and 1708, and attached to the mini-deck 1718 at points 1706 and 1704. The beams 1730 and 1740 may be attached together at point 1710. As one of skill will recognize, FIG. 17 illustrates one side of the tailgate 1002 and mini-deck 1718. As such, a mirror-image structure corresponding to scissor support 1730, 1740 is preferably attached to the opposite side of tailgate 1002 and mini-deck 1718. It is also preferable that some or all of points 1702, 1704, 1706, 1708, 1710 are attached to a sturdy axle (not shown) that extends from the near side of mini-deck 1718 to the far side of mini-deck 1718 and that the axle attaches to corresponding point 1702, 1704, 1706, 1708, 1710 on the opposite end of mini-deck 1718. Such axle(s) greatly increase the probability that the near and far scissor structures operate in a coordinated manner and prevent the mini-deck 1718 from tilting forward or backward while raised above the tailgate 1002. Each of attachments 1702, 1704, 1706, 1708, 1710 may be made with a bearing or other suitable attachment that allows for rotation about an axis. For example, points 1702, 1704, 1706, 1708 are preferably attached in raceways using shoes to constrain the ends of the beams 1730 and 1740 to the raceways while permitting movement therein. Such attachments will reduce shearing movement against the gate surface during cargo loading and unloading. Beams 1730 and 1740 may optionally be attached together by a dampener 1712 that is depicted as a line to avoid complicating the FIG., but which may be a hydraulic or other suitable dampener. A tension spring (not shown) may attach beams 1730 and 1740 together at or near points 1702 and 1708, to provide mechanical assistance with raising or lowering mini-deck 1718 from and into recess 1720. Alternatively the locations of spring (not shown) and dampener 1712 may be reversed. Alternatively, if the mini-deck 1718 is constructed such that it may rise to a height of approximately 12 inches above the deck, it may be desirable to use compressive springs (not shown) located between the tailgate 1002 and mini-deck 1718 in place of the tension spring. Due to the presence of the spring, it might be necessary for a person to stand on the mini-deck to compress it into recess 1720 for stowage. Alternatively, a mechanical crank or other suitable mechanism (not shown) may be provided for compressing mini-deck 1718 into recess 1720 for stowage without relying upon the weight of a person.

Mini-deck 1718 may be locked into place with a key or other suitable locking mechanism (not shown). Mini-deck 1718 may be released by a dedicated handle (not shown) or other suitable release mechanism. It is further desirable to provide a mechanism to secure the mini-deck 1718 in a stable position when raised. This may be accomplished in many ways. One such method of securing the mini-deck 1718 in the raised position may be the use of an adjustable hinged pipe with a spring-loaded ball (not shown) attached to the pipe. The ball may be seated in a recess in the bottom of the mini-deck 1718, preferably near the middle, such that it depresses minimally when laden.

Figure 18:
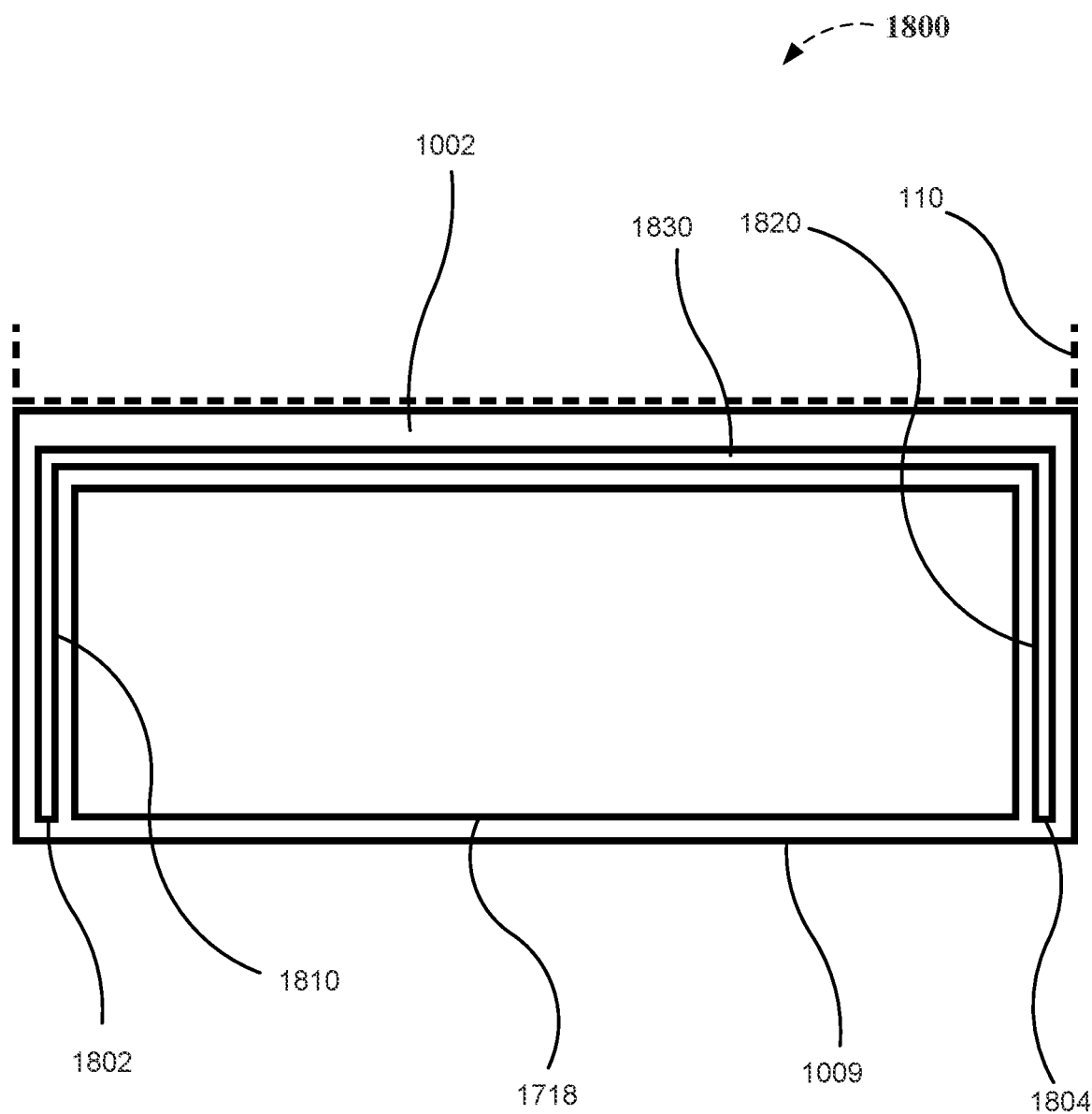
FIG. 18 illustrates a block diagram of an overhead view of an embodiment of the inventive tailgate in a horizontal position.

FIG. 18 depicts an overhead block view of an embodiment of tailgate 1002 in an open/horizontal position. This embodiment incorporates both mini-deck 1718 and a hinged embedded support rack indicated by beams 1810, 1820, 1830. Beam 1810 may be rotatably attached to tailgate 1002 at point 1802. Beam 1820 may be rotatably attached to tailgate 1002 at point 1804. Beam 1830 may be attached at its ends to beams 1810 and 1820, with the attachment at the ends opposite points 1802 and 1804. If the rack is suitably stiff, rotation about points 1804 and 1802 will allow beam 1830 to raise above the level of the tailgate 1002 to provide a support rack for lengthy cargo. It is preferable that both beams 1810 and 1820 rotate about an axis that passes through points 1802 and 1804. If beams 1810 and 1820 are permitted to rotate approximately 135 degrees from their resting position, then beam 1830 may be disposed at approximately the height of the bed 110 and at a point that extends beyond edge 1009 of the tailgate 1002, to allow for support for very lengthy items that extend beyond mini-deck 1718. The exact angle at which rotation of beams 1810 and 1820 should be stopped is dependent on the length of beams 1810 and 1820 and the height of the bed 110 above the tailgate 1002. In some embodiments, a mechanical clamp or other suitable tightening or locking device may be provided at one or both of points 1802 and 1804 to permit locking the rack at different angles. Such device may include holes and a pin for locking or it may include a lever to tighten a clamp or other suitable mechanisms.

In a preferred embodiment, beams 1810, 1820, and 1830 are stowed in a recess in tailgate 1002 when not deployed, to avoid interference with other uses. It is also preferable to include one or more locks or latches to secure beam 1830 to tailgate 1002 when not deployed as a rack. Beam 1830 may incorporate guard grooves to align long thin cargoes and may further incorporate tie-down anchors for securing loads.

Figure 19:
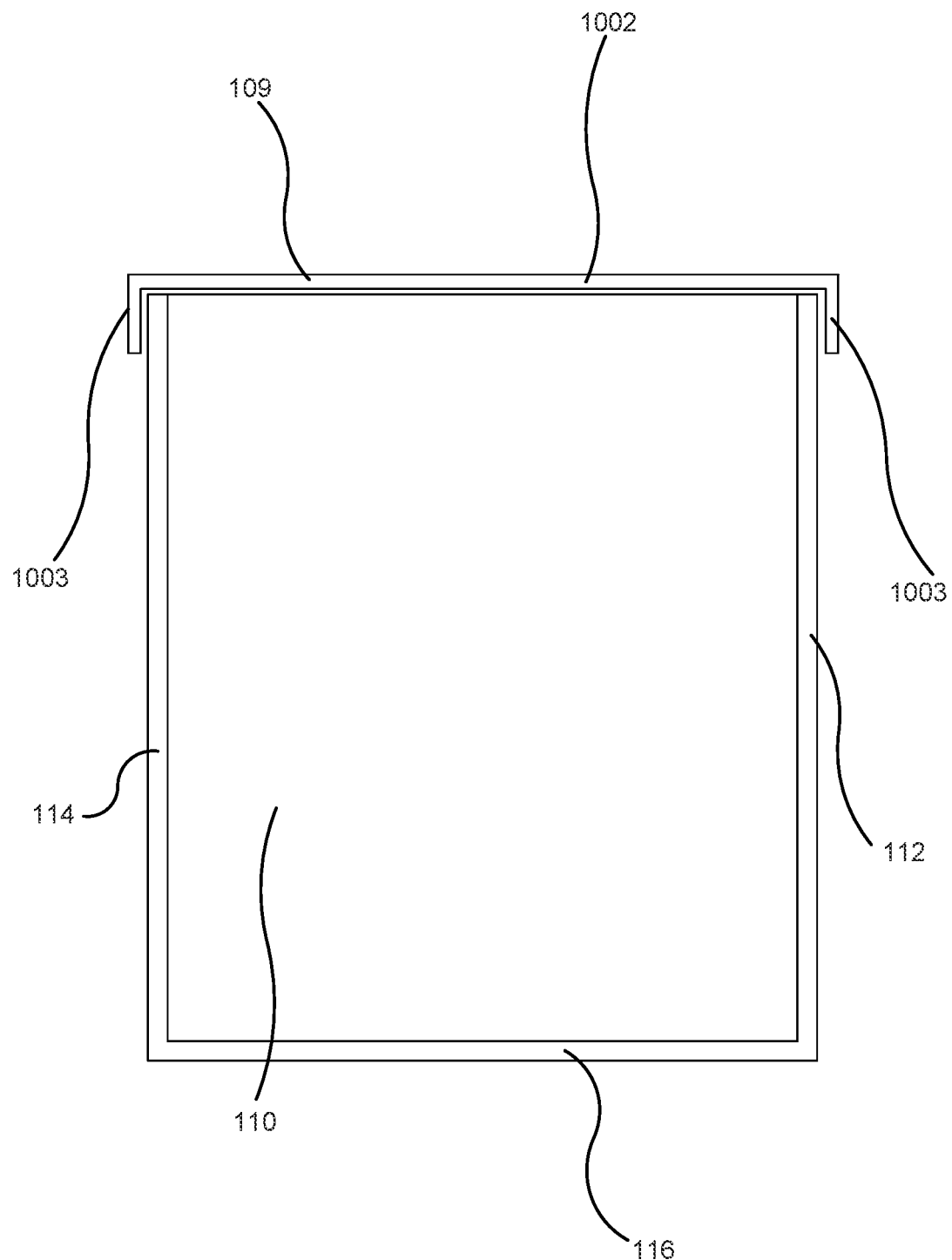
FIG. 19 illustrates a block diagram of an overhead view of an embodiment of the inventive tailgate in a vertical position and a truck bed.

FIG. 19 depicts an overhead view of block diagram of an embodiment of the inventive tailgate 1002 as attached to the cargo box of a pickup truck 100. In this FIG., tailgate 1002 is in a closed/vertical position. Tailgate 1002 preferably extends across the entire width of bed 110 and lever arms 1003 are attached beyond part or all of sidewalls 114 and 112. Lever arms 1003 may be sealed with a gasket or other suitable seal along all three mating edges of gate 1002 to reduce loss of particulate or granular loads such as sand, sawdust, fertilizer, or the like.

Figure 20:
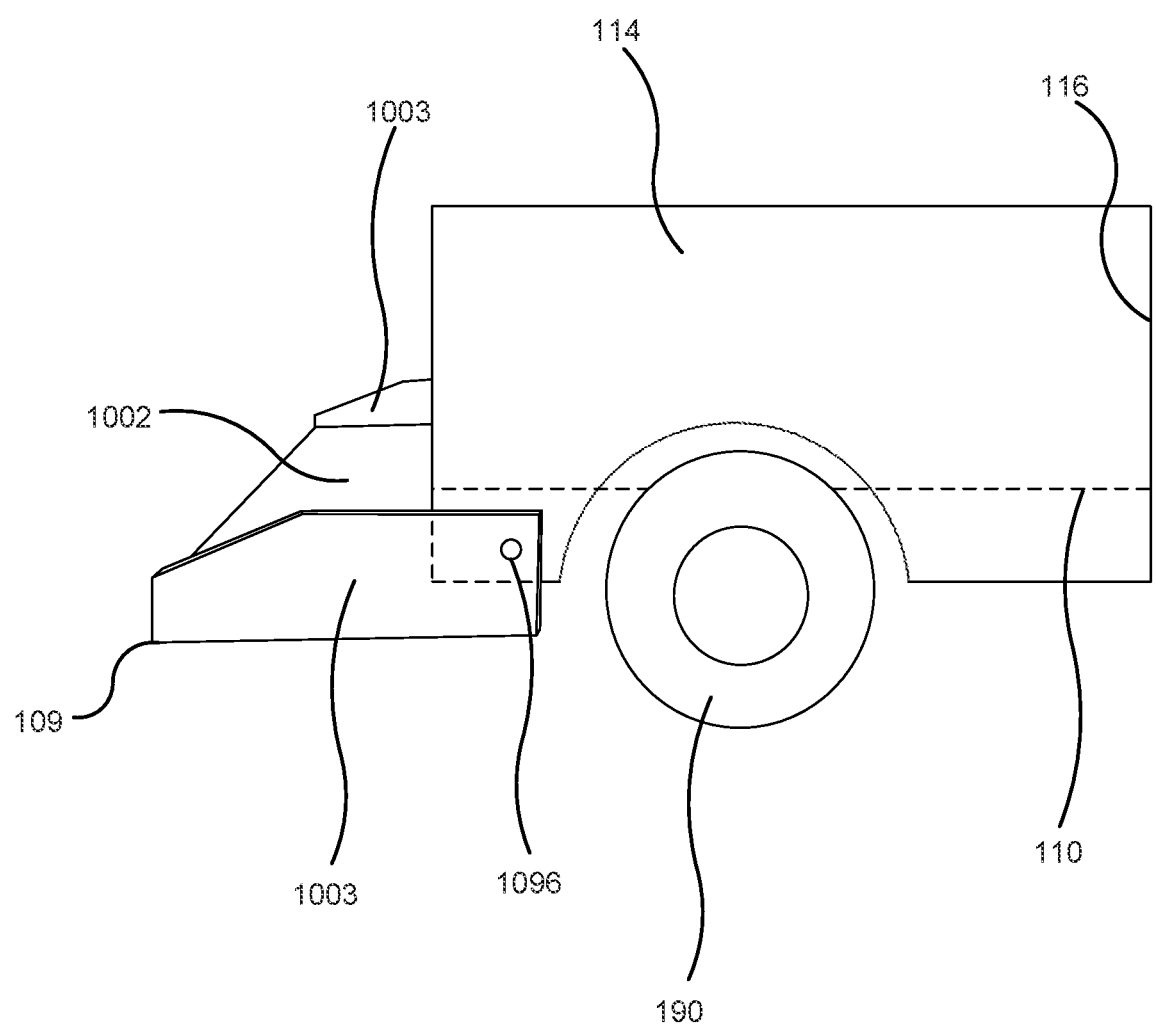
FIG. 20 illustrates a perspective view of the passenger side of an embodiment of the inventive tailgate in a horizontal position and a truck bed.

FIG. 20 depicts a perspective view of the passenger side of pickup truck 100 that is constructed with an embodiment of the inventive tailgate 1002. In this depiction, tailgate 1002 is in an open/horizontal position. It can be seen that rotation about thrust bearing 1096 results in the lower edge of the tailgate being below and forward (relative to the primary direction of travel of the truck) of the rearmost edge of bed 110. In this depiction, lever arms 1003 are constructed with a significant body to reduce deformation of tailgate 1002.

Figure 21:
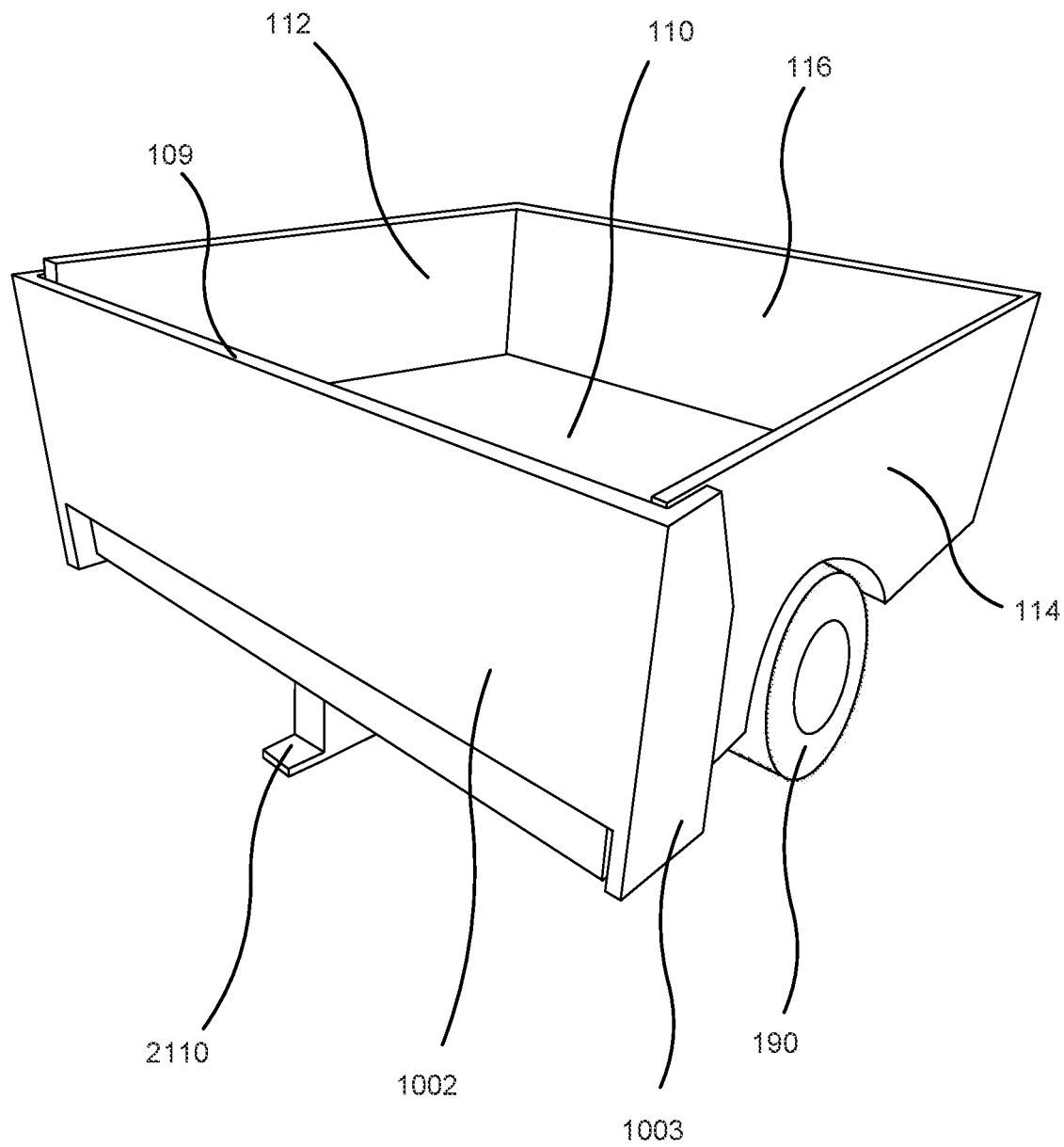
FIG. 21 illustrates a perspective view of the rear and passenger side portions of a truck bed and an embodiment of the inventive tailgate in a vertical position.

FIG. 21 depicts a perspective view of the rear and passenger side of a pickup truck cargo box constructed with an embodiment of the inventive tailgate. In this depiction, a platform 2110 is provided for supporting tailgate 1002 when tailgate 1002 is in the open/horizontal position. Platform 2110 reduces the deformation and strain on tailgate 1002 when weight is placed on tailgate 1002 in the open/horizontal position. As can be seen, in this embodiment, the lower edge of tailgate 1002 is higher than the lower edges of lever arms 1003 to allow for clearance when rotating between open and closed positions. Notably, platform 2110 is depicted as a small platform, possibly comprising a trailer hitch receiver in the middle of bed 110. However, platform 2110 may be of various widths, and may extend across the width of bed 110 and be incorporated into a bumper or other suitable structure.

Figure 22:
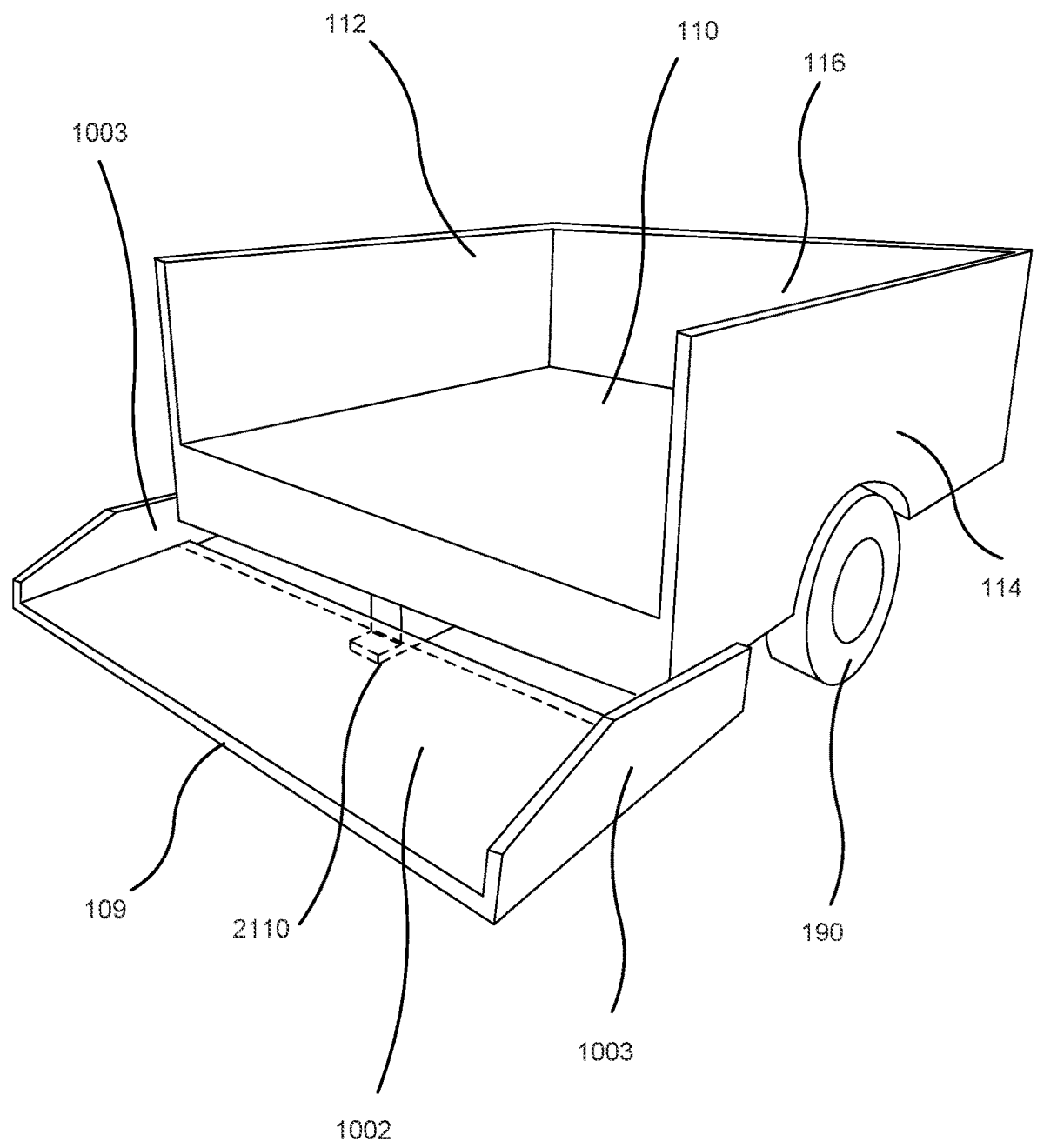
FIG. 22 illustrates a perspective view of the rear and passenger side portions of a truck bed and an embodiment of the inventive tailgate in a horizontal position.

FIG. 22 depicts the same view as FIG. 21, with the exception that the tailgate 1002 is depicted in an open/horizontal position. In FIG. 22, a dashed line represents the lower edge of tailgate 1002 and shows that it is in contact with supporting platform 2110. A protective bumper or other suitable device may be provided on platform 2110 to reduce scratching of tailgate 1002.

Figure 23:
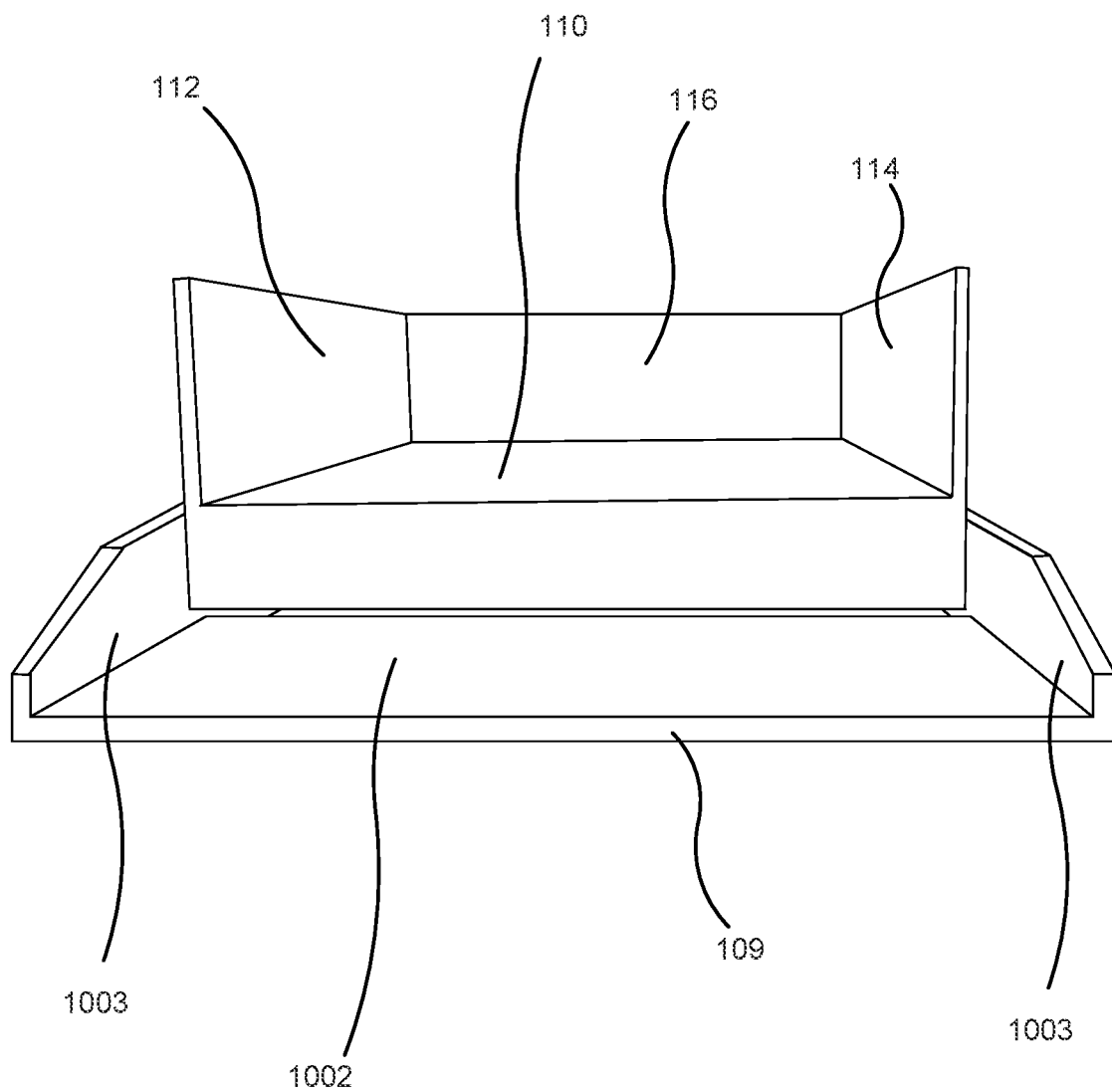
FIG. 23 illustrates a perspective view of the rear portions of a truck bed and an embodiment of the inventive tailgate in a horizontal position.

FIG. 23 is a rear perspective view of the embodiment shown in FIGS. 21 and 22 with the tailgate 1002 disposed in an open/horizontal position. As can be seen, tailgate 1002 is substantially closer to the ground level than the top of bed 110.

Figure 24:
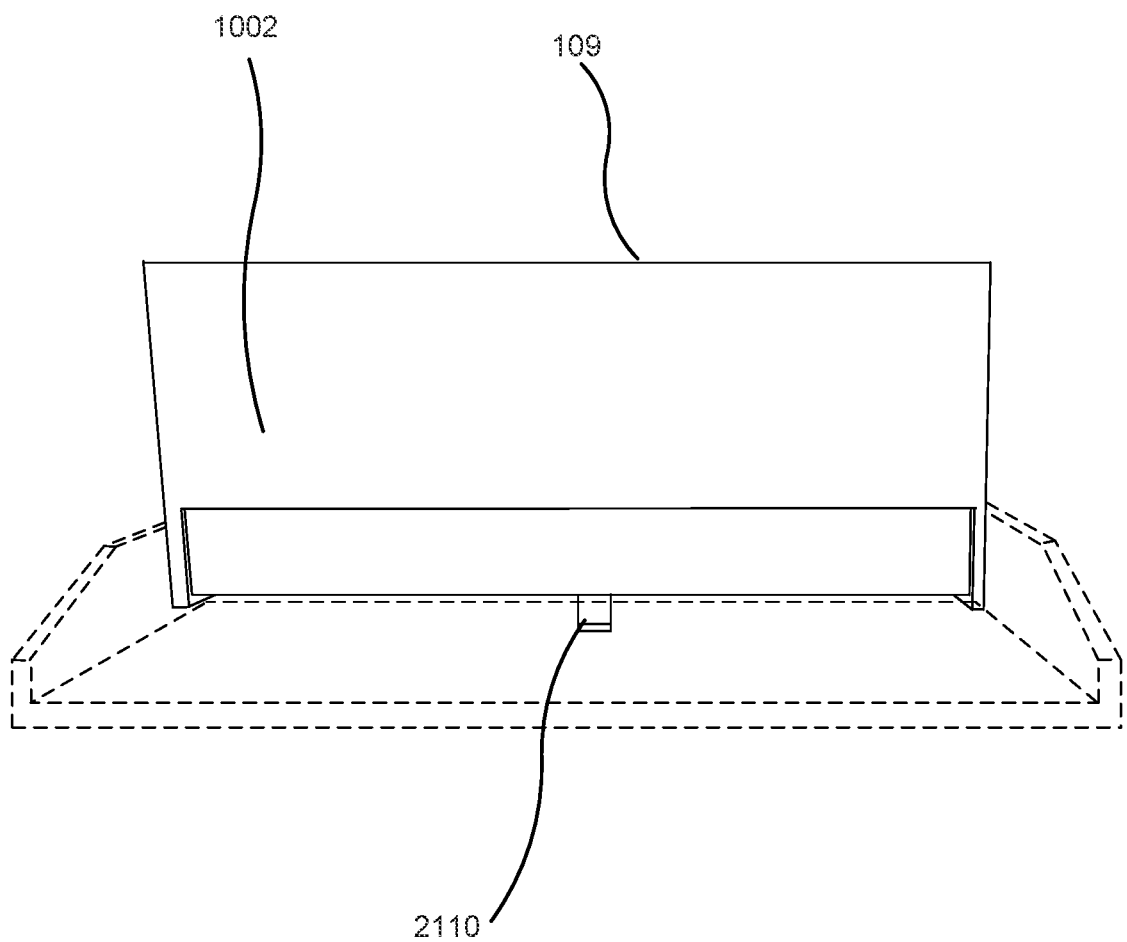
FIG. 24 illustrates a perspective view of the rear portions of a truck bed and an embodiment of the inventive tailgate in a vertical position.

FIG. 24 is a perspective view from the same angle as FIG. 23, except that in FIG. 24, the tailgate 1002 is disposed in a closed/vertical position. In FIG. 24, the position of the open tailgate 1002 is depicted with dashed lines.

Figure 25:
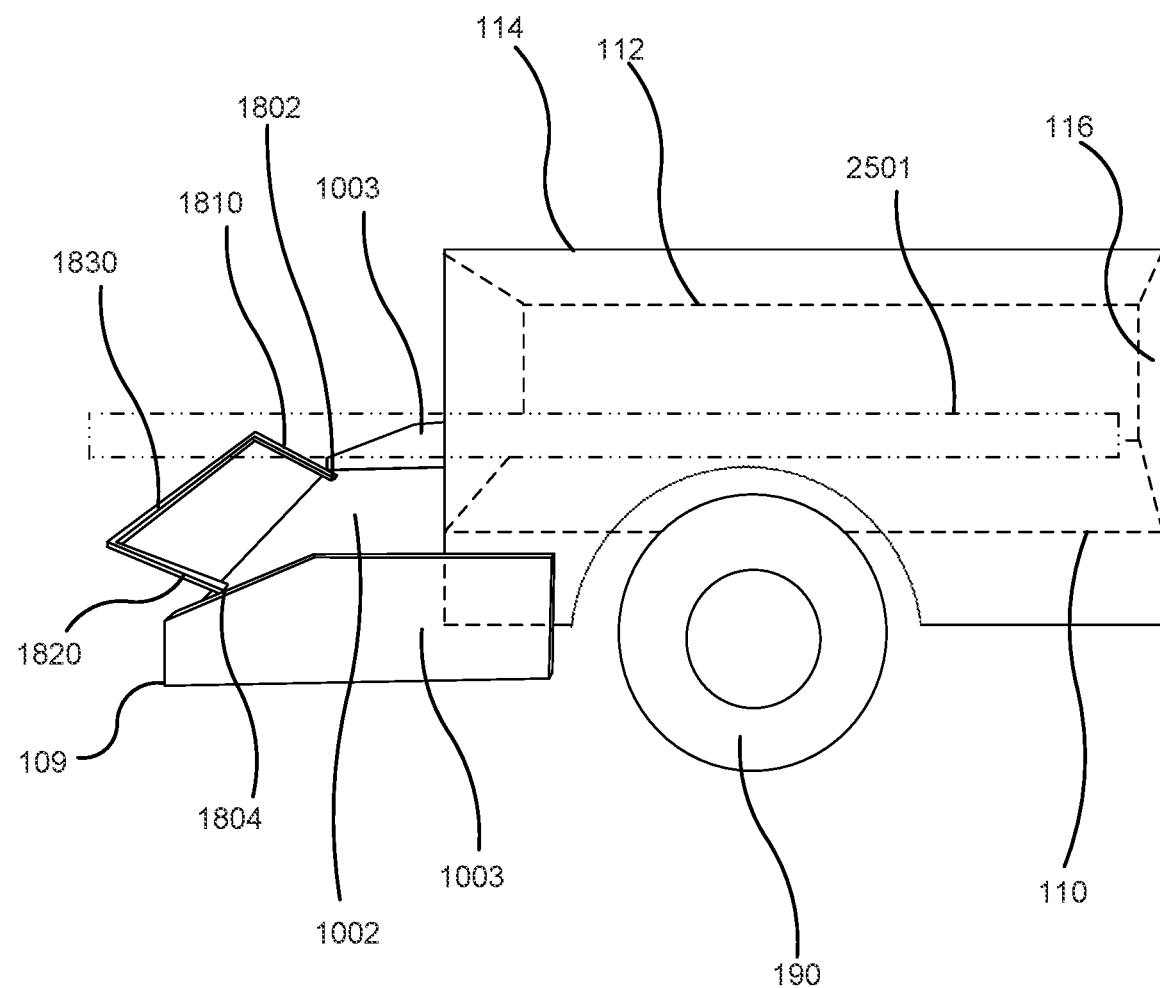
FIG. 25 illustrates a perspective view of the passenger side of an embodiment of the inventive tailgate in a horizontal position and a truck bed.

FIG. 25 is a perspective view from the same angle as FIG. 20. In FIG. 25, a support rack 1810, 1820, 1830 is depicted in a deployed position wherein it is at an angle of approximately 135 degrees from the rack's angle of rest in the tailgate 1002. Lengthy cargo 2501 is depicted using a dot-dot-dash line. Cargo 2501 extends from near the front wall 116 to beyond the length of the tailgate 1002 and even beyond rack 1810, 1820, 1830.

Figure 26:
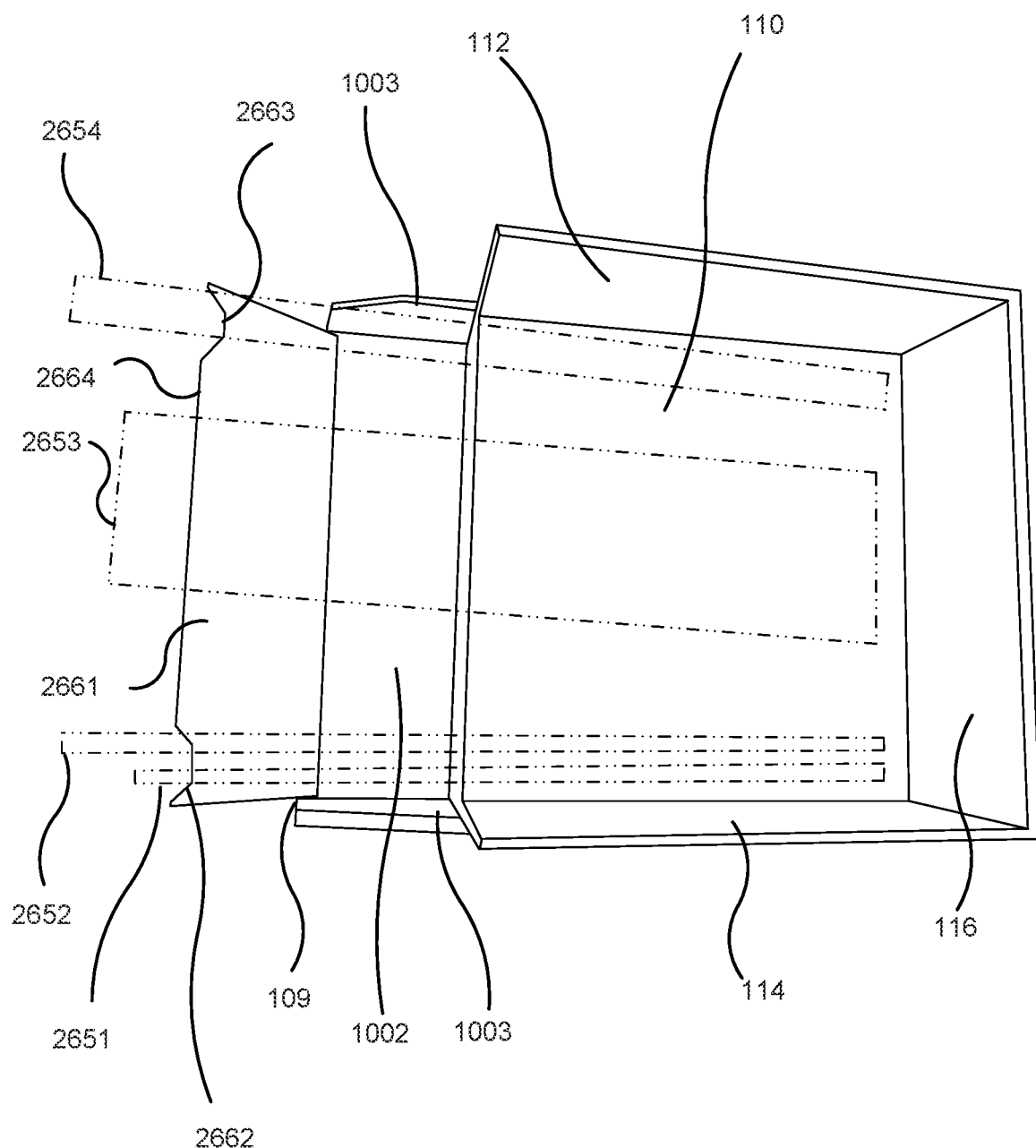
FIG. 26 illustrates an overhead perspective view of an embodiment of the inventive tailgate in a horizontal position and a truck bed.

FIG. 26 provides an overhead perspective view of a cargo box employing an embodiment of the inventive tailgate 1002 in which a rack 2661 takes the form of a plate that may be hinged from the tailgate 1002. Tailgate 1002 is depicted in the open/horizontal position. Lengthy items 2651, 2652, 2653, and 2654 (denoted with dot-dot-dash lines) may be rested on the bed 110 and the edge 2664 of the rack 2661. The rack may also include guide features 2662, 2663 that allow for placement of such lengthy items in a more secure manner. As illustrated, items 2651 and 2652 are placed in guide feature 2662. Also as illustrated, item 2654 is placed in guide feature 2663. When rack 2661 is deployed, it is preferable that the height of edge 2664 above the ground be approximately the same as the height of bed 110 to reduce stress on the items being supported by the rack. While the guide features in FIG. 26 are illustrated as concave features 2662, 2663, one of ordinary skill will appreciate that such guide features may take many forms to accommodate various types of cargo. In one embodiment, it is possible to have an interchangeable set of guide features that may be attached to or removed from edge 2664 as desired. For example, a guide feature having small arcuate resting positions may be used for small diameter pipes, while a guide feature having large arcuate resting positions may be used for large diameter pipes, and a guide feature having rectangular cutouts may be used for lumber such as 2×4 boards. Tie downs (not illustrated) may also be present on rack 2661.

Figure 27:
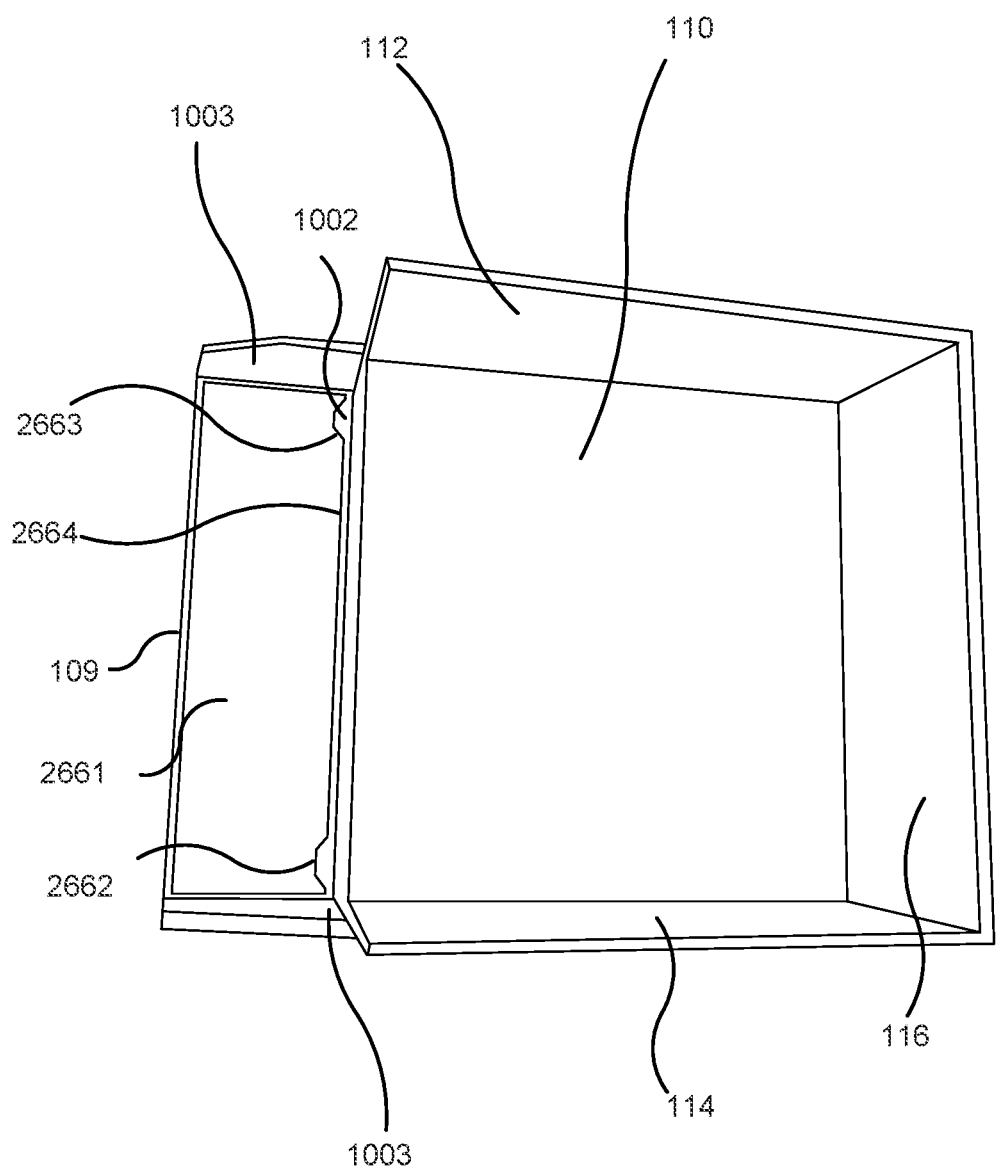
FIG. 27 illustrates an overhead perspective view of an embodiment of the inventive tailgate in a horizontal position and a truck bed.

FIG. 27 provides the same perspective as FIG. 26, except that in FIG. 27 the rack 2661 is not deployed. Rack 2661 is depicted as folded closed against tailgate 1002. Rack 2661 may lay flush against the top of tailgate 1002, or rack 2661 may fit into a recess (not shown) in tailgate 1002. It is preferable to provide an attachment mechanism whereby rack 2661 may be secured to tailgate 1002 when not deployed. Further, the perimeter of rack 2661 may be sealed using an appropriate sealing mechanism to prevent the intrusion of particulate or granular matter between rack 2661 and tailgate 1002 while the rack 2661 is not in use.

Figure 28:
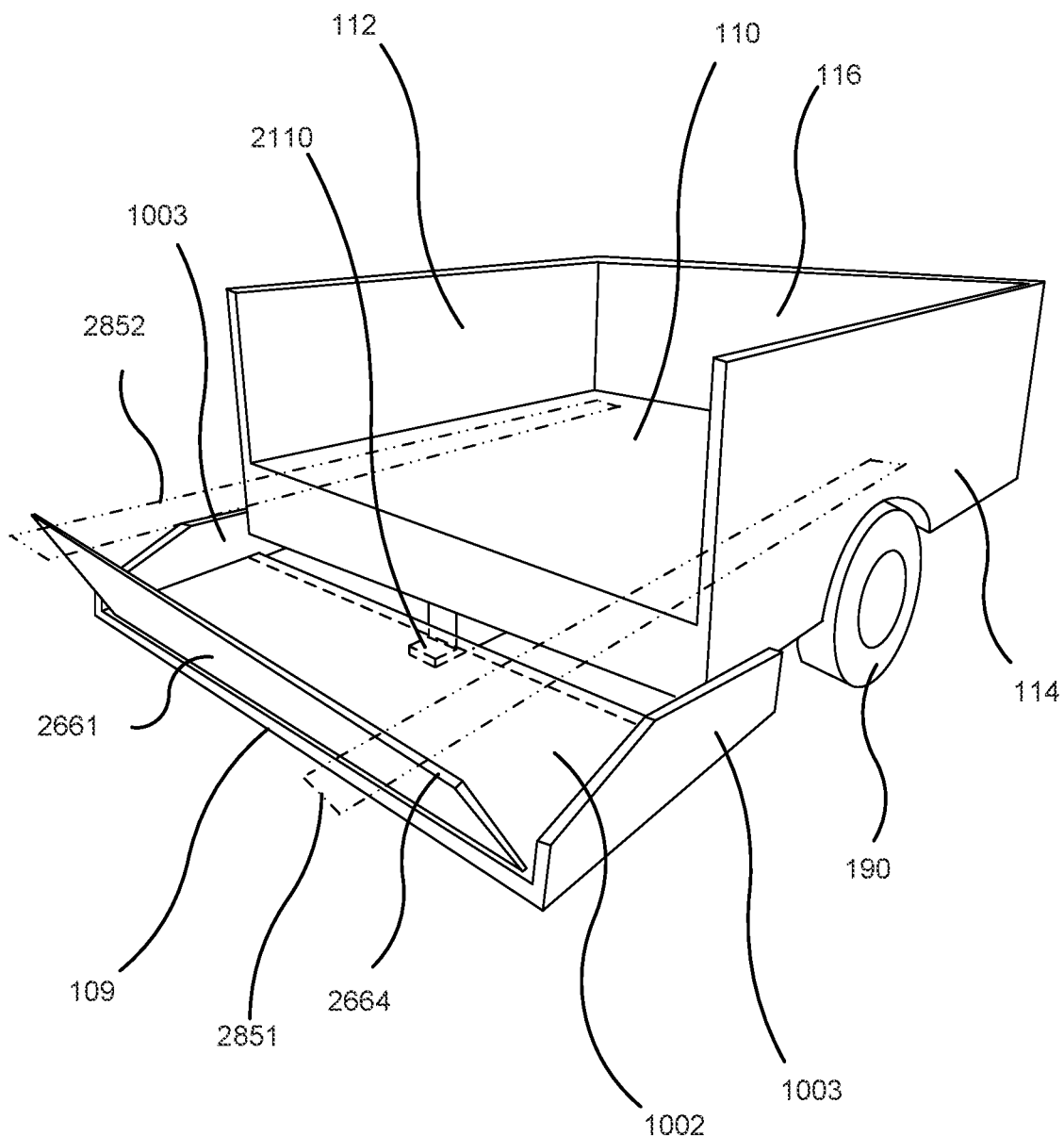
FIG. 28 illustrates a perspective view of the rear and passenger side portions of a truck bed and an embodiment of the inventive tailgate in a horizontal position.

FIG. 28 depicts the same view as FIG. 22 and shows rack 2661 deployed and supporting cargo items 2851 and 2852. Cargo items 2851 and 2852 are depicted using dot-dot-dash lines. Cargo items 2851 and 2852 may rest on bed 110 and edge 2664 of rack 2661 when tailgate 1002 is open/horizontal and rack 2661 is deployed for use.

Figure 29:
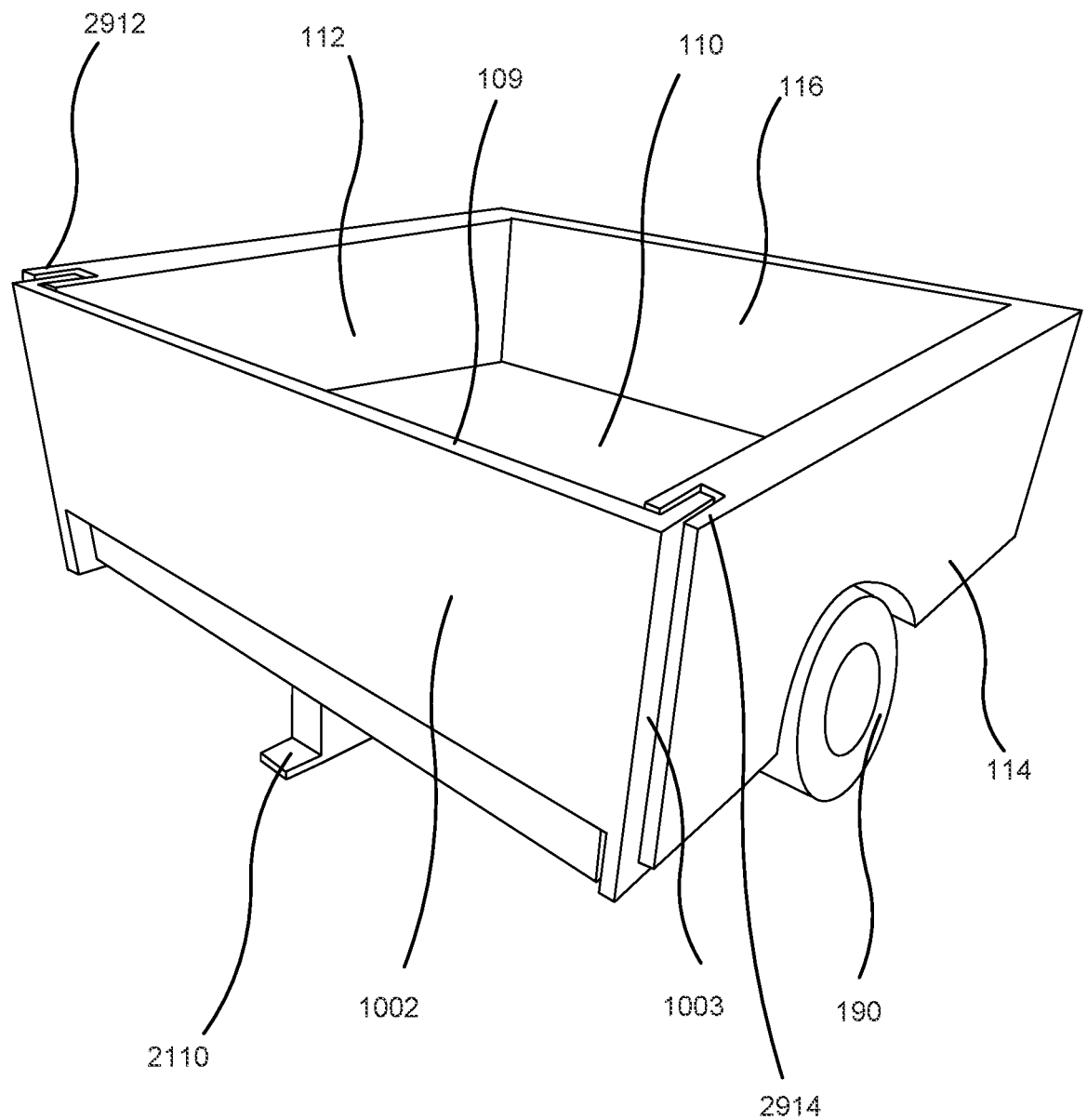
FIG. 29 illustrates a perspective view of the rear and passenger side portions of a truck bed and an embodiment of the inventive tailgate in a vertical position.

FIG. 29 depicts the same view as FIG. 21 and presents an alternative embodiment wherein, when tailgate 1002 is in the closed/vertical position, lever arm 1003 rests between sidewall 114 and sidewall protrusion 2914 on the passenger/right side and between sidewall 112 and sidewall protrusion 2912 on the driver/left side of the truck 100. The alternative embodiment may be used for both aesthetic and aerodynamic purposes rather than the embodiment shown in FIG. 21.

Figure 30:
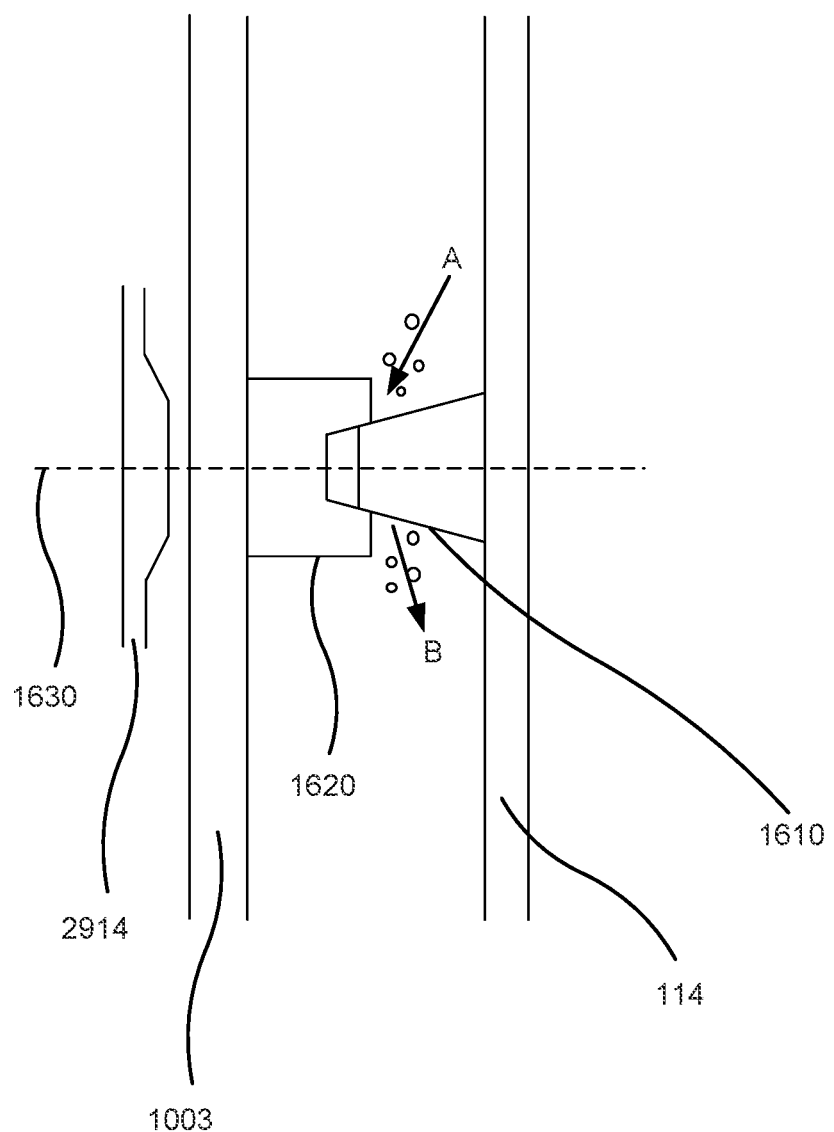
FIG. 30 illustrates a block diagram of a thrust bearing according to an embodiment of the invention.

FIG. 30 provides another block diagram of a thrust bearing 1600 suitable for use as thrust bearing 1096 in the inventive tailgate 1002, from an overhead perspective. In a reverse of the installation depicted in FIG. 16, in FIG. 30 conical portion 1610 is depicted as attached to a truck sidewall 114 and substantially conical portion 1620 is depicted as attached to lever arm 1003 of tailgate 1002. The entire assembly is enclosed between a wheel fairing, e.g., protrusion 2914 and sidewall 114. Arrow A is depicted above axis 1630 showing particles (depicted as circles) entering the thrust bearing 1600 between 1610 and 1620. Arrow B is depicted below axis 1630 showing that particles (depicted as circles) later exit the bearing 1600 due to gravitational forces and rotational forces. In this manner, the use of a thrust bearing 1600 permits continued operation of the tailgate 1002 with reduced possibility of clogging the bearing.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What has been described above includes examples of the implementations of the present invention. It is, of course, not possible to describe every conceivable combination of components or methods for purposes of describing the claimed subject matter, but many further combinations and permutations of the subject embodiments are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the various embodiments include a system as well as the various methods of the claimed subject matter.

What is claimed is:

1. A tail gate for use with a vehicle having a bed, a front end, and a rear end, comprising:
    an assembly that may be rotated about a substantially horizontal axis from a substantially vertical first position to a substantially horizontal second position, the assembly comprising:
    a gate portion having a surface substantially disposed along a first plane when the assembly is in the first position, wherein the first plane is substantially perpendicular to a first axis, the first axis extending parallel to the bed and from a front center of the vehicle to a rear center of the vehicle;
    a seal portion attached to the gate portion in proximity to a bottom edge of the gate portion, the seal portion substantially disposed along a second plane parallel to the bed of the vehicle and perpendicular to the first plane when the seal portion is in the first position, the assembly having a long dimension that is approximately the same as a width of the bed;
    wherein the seal portion is disposed below a height of the bed and a top edge of the seal portion is arranged in close proximity to a bottom of the bed when the assembly is in the first position;
    a first pivot structure and a second pivot structure, the first pivot structure located near a first end of the gate portion and mechanically connected to a first end of the gate portion, the second pivot structure located near a second end of the gate portion and mechanically connected to the second end of the gate portion, the first end located opposite the second end;
    the first pivot structure and the second pivot structure positioned to allow rotation of the assembly about the substantially horizontal axis, the substantially horizontal axis located below the bed and between the first plane and the front end;
    wherein, when the assembly is in the first position, the gate portion substantially closes the rear end of the bed; and
    wherein, when the assembly is in the second position, the surface of gate portion is substantially parallel to the bed and below a top level of the bed, and the seal portion is substantially perpendicular to the bed.

2. The tail gate of claim 1, further comprising:
a support rack embedded within the surface of the gate portion, the support rack pivotally attached to the gate portion, such that when the assembly is in the second position, the support rack may be pivoted from within the surface of the gate portion to an upright position, to provide a support for items laid in the bed and extending beyond an edge of the bed.

3. The tail gate of claim 1, further comprising:
a pop-up mini gate embedded within the surface of the gate portion and extendable in a direction substantially perpendicular to the surface so as to be arranged at a height that is substantially aligned with the height of the bed when the assembly is in the second position and the mini gate is extended.

4. The tail gate of claim 3, further comprising:
a support rack embedded within the surface of the gate portion, the support rack pivotally attached to the gate portion, such that when the assembly is in the second position, the support rack may be pivoted from within the surface of the gate portion to an upright position;
the support rack arranged about a perimeter of the mini gate when both are positioned within the surface of the gate portion.

5. The tail gate of claim 1, wherein:
the first pivot structure and the second pivot structure are not substantially exposed to solid materials when such materials are in the bed.

6. The tail gate of claim 1, further comprising:
a seal to close gaps between the assembly and the bed to reduce spillage of particulate materials when such materials are in the bed.

7. The tail gate of claim 1, wherein:
the vehicle comprises a wheel well for a rear wheel, and a side wall extending upward from the surface of the bed, the side wall arranged substantially perpendicular to a surface of the bed and substantially perpendicular to the first plane, the side wall arranged in proximity to the wheel well; and the first pivot structure is disposed within a compartment between the sidewall and the wheel well;

the first pivot structure comprising a thrust bearing.

8. The tail gate of claim 7, wherein:

when the assembly is in the first position, the compartment is substantially closed; and when the assembly is in the second position, the compartment may be accessed for cleaning or lubrication.

9. The tail gate of claim 1, wherein:

the vehicle has a removable, centered, high ball trailer hitch; and the high ball trailer hitch is positioned to support a bottom surface of the gate portion when the assembly is in the second position.

10. The tail gate of claim 1, further comprising:

a tongue and groove alignment structure disposed at an edge of the gate portion, the alignment structure configured to contact a frame of the vehicle below the bed, the alignment structure for reducing lateral deformation of the gate portion when the assembly is in the second position.

11. A pivoting device for use in a vehicle comprising a bed with a top surface arranged substantially perpendicular to a first axis, the first axis extending in the direction of gravity, the bed having a substantially horizontal first bed edge located at a rear of a vehicle, the first bed edge being substantially linear, the pivoting device comprising:

a gate having a first substantially rectangular outline and a gate width approximately equal to a length of the first bed edge, the gate having a lower gate edge extending substantially parallel to the first bed edge, the lower gate edge approximately the same length as the first bed edge;

a seal portion having a second substantially rectangular outline, the seal portion having a first seal edge, the first seal edge approximately the same length as the lower gate edge, the first seal edge attached along its length to the lower gate edge such that ends of the first seal edge are in close proximity to respective ends of the lower gate edge, the second substantially rectangular outline disposed substantially perpendicular to the first substantially rectangular outline;

first and second pivoting structures arranged to pivot about a single pivot axis substantially parallel to the first bed edge, the lower gate edge, and the first seal edge, the first and second pivoting structures mechanically attached to the gate;

the pivot axis disposed lower than the top surface of the bed and forward of the first bed edge with respect to a primary direction of travel of the vehicle, such that the gate and seal portion may be rotated about the pivot axis between (a) a first position in which the first substantially rectangular outline is substantially perpendicular to the top surface and substantially parallel to the first axis, and (b) a second position in which the first substantially rectangular outline is substantially parallel to the top surface of the bed;

wherein, when disposed in the second position, a top surface of the gate is lower than the top surface of the bed, such that the top surface of the gate may be used as an intermediate step between a surface on which the vehicle is disposed and the top surface of the bed; and a support rack embedded within the top surface of the gate, the support rack pivotally attached to the gate, such that when the gate is in the second position, the support rack may be pivoted from within the top surface of the gate to an upright position, to provide a support for items laid in the bed and extending beyond the edge of the bed.

12. The device of claim 11 wherein:

when disposed in the second position, the lower gate edge is (a) below the first bed edge and (b) forward or aft of the first bed edge with respect to the primary direction of travel of the vehicle.

13. The device of claim 11, wherein:

the vehicle has a removable, centered, high ball trailer hitch; and the high ball trailer hitch is positioned to support a bottom surface of the gate when the gate is in the second position.

14. The device of claim 11, further comprising:

a pop-up mini gate embedded within the top surface of the gate and extendable in a direction substantially perpendicular to the top surface of the gate so as to be arranged at a height that is substantially aligned with the top surface of the bed when the gate is in the second position and the mini gate is extended.

15. The device of claim 14, further comprising:

a support rack embedded within the top surface of the gate, the support rack pivotally attached to the gate, such that when the gate is in the second position, the support rack may be pivoted from within the top surface of the gate to an upright position;

the support rack arranged about a perimeter of the mini gate when both are positioned within the surface of the gate position.

16. The device of claim 11, wherein:

the first pivoting structure and the second pivoting structure are not substantially exposed to solid materials when such materials are in the bed.

17. The device of claim 11, further comprising:

a seal to close gaps between the gate and the bed to reduce spillage of particulate materials when such materials are in the bed.

18. A pivoting device for use in a vehicle comprising a bed with a top surface arranged substantially perpendicular to a first axis, the first axis extending in the direction of gravity, the bed having a substantially horizontal first bed edge located at a rear of a vehicle, the first bed edge being substantially linear, the pivoting device comprising:

a gate having a first substantially rectangular outline and a gate width approximately equal to a length of the first bed edge, the gate having a lower gate edge extending substantially parallel to the first bed edge, the lower gate edge approximately the same length as the first bed edge;

a seal portion having a second substantially rectangular outline, the seal portion having a first seal edge, the first seal edge approximately the same length as the lower gate edge, the first seal edge attached along its length to the lower gate edge such that ends of the first seal edge are in close proximity to respective ends of the lower gate edge, the second substantially rectangular outline disposed substantially perpendicular to the first substantially rectangular outline;

first and second pivoting structures arranged to pivot about a single pivot axis substantially parallel to the first bed edge, the lower gate edge, and the first seal edge, the first and second pivoting structures mechanically attached to the gate;

the pivot axis disposed lower than the top surface of the bed and forward of the first bed edge with respect to a primary direction of travel of the vehicle, such that the gate and seal portion may be rotated about the pivot axis between (a) a first position in which the first substantially rectangular outline is substantially perpendicular to the top surface and substantially parallel to the first axis, and (b) a second position in which the first substantially rectangular outline is substantially parallel to the top surface of the bed;

wherein, when disposed in the second position, a top surface of the gate is lower than the top surface of the bed, such that the top surface of the gate may be used as an intermediate step between a surface on which the vehicle is disposed and the top surface of the bed;

wherein the vehicle comprises a wheel well for a rear wheel, and a side wall extending upward from the top surface of the bed, the side wall arranged substantially perpendicular to the top surface of the bed and substantially perpendicular to the gate, the side wall arranged in proximity to the wheel well;

the first pivoting structure is disposed within a compartment between the sidewall and the wheel well; and the first pivoting structure comprises a thrust bearing.

19. The device of claim 18, wherein:

when the gate is in the first position, the compartment is substantially closed; and when the gate is in the second position, the compartment may be accessed for cleaning or lubrication.

20. The device of claim 18, wherein:

the vehicle has a removable, centered, high ball trailer hitch; and the high ball trailer hitch is positioned to support a bottom surface of the gate when the gate is in the second position.

* * * * *